United States Patent
Hattori et al.

[11] Patent Number: 6,111,670
[45] Date of Patent: Aug. 29, 2000

[54] HOLOGRAM DEVICE AND METHOD FOR PRODUCING THE SAME

[75] Inventors: Hidekazu Hattori, Nagoya; Kenichiro Takada, Kuwana; Katsuyoshi Nishii, Okazaki; Tooru Matsumoto, Ichinomiya; Tomoyuki Kanda, Inabe-gun, all of Japan

[73] Assignee: Denso Corporation, Kariya, Japan

[21] Appl. No.: 08/994,361

[22] Filed: Dec. 19, 1997

[30] Foreign Application Priority Data

Dec. 20, 1996 [JP] Japan .................................. 8-341661
Jul. 29, 1997 [JP] Japan .................................. 9-203043

[51] Int. Cl.⁷ .................................................. G02B 5/32
[52] U.S. Cl. .............................................. 359/15; 359/28
[58] Field of Search ............................. 359/1, 15, 16, 359/28

[56] References Cited

U.S. PATENT DOCUMENTS

| | | | |
|---|---|---|---|
| 3,909,111 | 9/1975 | Meyerhofer | 359/28 |
| 4,039,245 | 8/1977 | Yano . | |
| 5,610,733 | 3/1997 | Feldman et al. | 359/15 |

FOREIGN PATENT DOCUMENTS

| | | |
|---|---|---|
| 582 229 | 2/1994 | European Pat. Off. . |
| 717 389 | 6/1996 | European Pat. Off. . |
| 828 202 | 3/1998 | European Pat. Off. . |
| 2 640 772 | 6/1990 | France . |
| B-52-12568 | 4/1977 | Japan . |
| 57-6878 | 1/1982 | Japan . |
| 3-157684 | 7/1991 | Japan . |
| 5-127022 | 5/1993 | Japan . |
| 6-51239 | 2/1994 | Japan . |
| 6-56484 | 3/1994 | Japan . |
| 7-84504 | 3/1995 | Japan . |
| 7-315893 | 12/1995 | Japan . |
| 8-202248 | 8/1996 | Japan . |
| 2 104 678 | 3/1983 | United Kingdom . |
| 96/34322 | 10/1996 | WIPO . |

OTHER PUBLICATIONS

Patent Abstract of Japan, vol. 096, No. 012, Dec. 26, 1996 & JP 08 202248 A (Nippondenso Co. Ltd.), Aug. 9, 1996.

*Primary Examiner*—Darren E. Schuberg
*Attorney, Agent, or Firm*—Pillsbury Madison & Sutro LLP

[57] ABSTRACT

A hologram of an increased size using a single color laser, capable of executing a full color regeneration in a desired view angle and a method for producing the hologram. A plurality of photo-sensitive members are independently exposed to obtain respective holograms, which are connected by using an adhesive layer 80 constructing a connecting means, in order to obtain an integrated hologram expanded in two-dimensional direction. The holograms are obtained by an interference of a reference light 22 and an object light passed through a light diffusing body 24 in order to cause the light diffusing body 24 to be recorded on the photo-sensitive member. The size of the light diffusing body 24 is such that the spectral characteristic of the diffused light from the hologram can attain a desired efficiency at least over the entire wavelength range of the visible light.

10 Claims, 26 Drawing Sheets

HOLOGRAM DEVICE AND METHOD FOR PRODUCING THE SAME

BACKGROUND OF THE INVENTION

1. Field of the Invention

The present invention relates to a hologram device and a method for producing a hologram and, in particular, to a screen hologram where a hologram is used for a screen and a method for producing such a screen hologram.

2. Description of Related Art

A screen hologram is known in the prior art. See, for example, Japanese Examined Patent Publication No. 52-12568. In such a screen hologram, a content of a display device is imaged on a transparent screen created under a principle of a hologram, so that a viewer can see the image, while allowing the viewer to see the background via the transparent screen. When the display device is not in use, the screen hologram acts only as a transparent plate.

Such a screen hologram is used, for example, for displaying a content such as an advertisement on a show window in a department store or an underground shopping mall and for displaying a necessary information at counter for a customer or a patient in a bank or hospital, while allowing a receptionist to identify the customer or patient. In the unused state, the screen hologram merely functions as a transparent plate, thereby preventing a view from being hindered by the hologram screen.

FIG. 52 shows a schematic arrangement of a display device using a transparent type of a screen hologram. At a rear side of the screen hologram 1 at a location above a screen hologram 1, a device for projecting an image such as a projector 3 is arranged. Light 31 from the projector 3 is projected to the screen hologram 1, so that an image is created on the screen hologram 1. Light 32 is thus emitted from the screen hologram 1, so that a viewer on a front side of the hologram screen can see a displayed image on the screen hologram. Furthermore, a background light 33 passes through the hologram screen 1 without being hindered, which allows the viewer to see not only the displayed content but also the background 7.

A modified arrangement is possible, where the projector 3 is arranged at the back side of the screen hologram 1 at a location below the hologram 1.

As a further modified arrangement, in place of the transparent type of hologram 1, the display device can employ a reflection type of screen hologram, which is per se, known. In such a reflection type, the projector is arranged on the front side of the hologram, so that a viewer on the front side of the hologram can see the displayed content.

Now, a system for producing a transparent type screen hologram will be explained with reference to FIG. 53. A reference numeral 110 denotes a laser light generator, from which a laser beam is emitted and is, at a beam splitter, divided into two beams 112 and 113. The first divided beam 112 is directed to an object lens 122, so that a diverted light is obtained, which is directed to an off-center concave mirror 114, so that a parallel beam 115 is obtained. The parallel beam 115 is passed through a light diffusing body 116 constructed, for example, as frosted glass, so that a diffused light, as an object light 117, is obtained. On the other hand, the second divided beam 113 is introduced into an object lens 121 to obtain a diverted light as a reference light 118.

The object light 117 and the reference light 118 are directed to a photosensitive member 120, so that light interference occurs, whereby generating a light interference fringe which is recorded on the photosensitive member 120. In this case, the light diffusing body 116 as a hologram is recorded in the photosensitive member 120. Thus, during regeneration process, the light diffusing body is re-generated, so that diffraction and diffusion of the re-generating light, at the hologram, occurrs. As a result, the hologram, from which the diffused light is emitted, functions as a screen.

FIG. 53 illustrates a method for the production of a screen hologram of a transparent type, where exposures to the object and reference lights are done on the same side of the photosensitive member 120. In case of a reflection type screen hologram, exposures to the object and reference lights are done on the opposite sides of the photosensitive member 120.

Furthermore, in the illustrated method, an arrangement of the optical system for an exposure is such that the laser beams, i.e., a reference light and an object light, are passed through the same horizontal plane, which allows the hologram of the desired size to be obtained by an execution of a single exposure process. This horizontal plane is, below, referred as an "exposure horizontal plane".

However, when a hologram produced by the method as explained with reference to FIG. 53 is used in an optical system for a regeneration as shown in FIG. 54, a projection of a white light to the hologram may cause, in a field of view of an observer, the upper part to have a blue color and the lower part to have a yellow or red color.

In order to overcome this problem, Japanese Examined Patent Publication No. 52-12568 proposes a multi-stage exposure method, where a series of exposures to a photosensitive member are done by using laser beams of red, green and blue color, respectively. As an alternative, exposures using laser beams of red, green and blue colors are done to separate photo sensitive members, which are, then, laminated.

However, these methods in the prior arts are defective in that three laser devices for laser beams of red, green and blue colors are necessary, which makes the system complicated.

Furthermore, the prior art method in FIG. 53 is also defective in that a desired quality of a hologram cannot be obtained when a large size of a hologram is needed due to a limitation in the size of the diffusing body. The reason will be explained with reference to FIG. 54. When a light from the projector 3 is projected to the screen hologram 1 for executing a re-generation of the screen hologram 1, the projected light is subjected to a diffraction at the screen hologram 1, so that a scattered light 11 having the same scattering property as that recorded in the hologram is obtained, which allows an observer to view an image on the screen hologram. In this case, a view range of the screen hologram is defined as an area in which an observer can view an image of a light diffusing body recorded in the photosensitive member. Thus, the size of a diffusing body recorded in the screen hologram 1 determines the view area of the screen hologram 1.

Now, a determination of the size of the diffusing body for producing a screen hologram having a desired view area will now be explained with reference to FIG. 55. In FIG. 55, a diffusing body is designated by a reference numeral 116. In front of the diffusing body 116, a photo-sensitive member 120, having top and bottom ends 120a and 120b, is arranged at a distance L1. A viewer 5 is located in front of the photo-sensitive member 120 at a distance L2. A view range is defined by a reference numeral 125 having ends 125a and 125b. The size of the diffusing body 116 is determined by the area of the diffusing body 116 defined by lines a1 and b1, where the line a1 is a line connecting the lower end 25b of the view area 125 with the upper end 120a of the photo-sensitive member 120 and a line b1 is a line connecting the upper end 125a of the view area 125 with the lower end 120b of the photo-sensitive member 120.

The size of the diffusing body 116 is actually limited by a particular arrangement of the optical system, that is determined by the value of the distance L1 between the photo-sensitive member 120 and the diffusing body 116 and the distance L2 between the photo-sensitive member 120 and the location of the viewer 5.

In short, the necessary size of the light diffusing body 116 for an exposure of the photo-sensitive element 120 is thus determined. Namely, the larger the size of the photo-sensitive member 120, the larger must be the size of the light diffusing body 116. In particular, in the case of an application of a screen hologram to a display device such as a show window, a hologram screen of an increased size is needed, which makes the size of the light diffusing body to be highly increased. For example, in order to produce a screen hologram of a diagonal size of 1 meter and of a view area (view angle) of ±20°, a diffusing body of a diagonal size of 3 meter is needed. A use of a diffusing body of such an increased size is actually impossible due to a limitation in a designing of an optical system. Namely, a limitation of the size of a light diffusing body makes it difficult to obtain a hologram screen of an increased size.

As another problem generated when producing a screen hologram of an increased size, it is necessary that, in FIG. 53, the light 115 for illuminating the light diffusing body 116 for producing the object light 117 must be expanded to a size larger than the size of the light diffusing body 116 and the reference light 118 must be expanded to a size larger than the size of the photo-sensitive member 120 for the production of the hologram. This makes the intensity of the laser beam to be reduced per unit area of the photo-sensitive member 120, which prolongs the exposure time, which is much longer than a period in which interference fringes stay in a stable condition on the photo-sensitive member 120, which makes the production of a hologram of an increased size very difficult. Namely, as is well known, an energy of a laser light for an exposure of a photo-sensitive member for a production is determined in accordance with a particular material constructing the photo-sensitive member. For example, a desired exposure amount for a photo-sensitive member is in a range between 100 to 300 mJ/cm$^2$ in case of a dichromatic gelatin and between a few to 50 mJ/cm$^2$ in case of a photo-polymer. Thus, an exposure time in a range of 30 minutes to a few hours is needed even when a laser of an output power of 10 watts is used. On the other hand, the time which is allowed for a production of a hologram is usually as short as about 10 minutes, which is much shorter than the above mentioned desired exposure time, which makes it very difficult to produce a hologram.

In short, the prior art is defective in that a production of a screen hologram of a increased size is difficult due to the requirements of an increased size of a light diffusing body and an prolonged duration of an exposure time.

SUMMARY OF THE INVENTION

The present invention aims to overcome the above-mentioned difficulties in the prior art and to provide a hologram device of an increased size, the production of which has heretofore been considered difficult and a method for producing such a hologram device.

According to the present invention, a plurality of hologram elements are made from photo-sensitive members by subjecting them to independent exposures and by connecting the hologram elements with each other so as to be integrated to a single hologram of an increased size in two-dimensions.

It is preferable that a light diffusing body is recorded in the hologram element. A two-dimensional arrangement of the integrated hologram elements on which a diffusion body is recorded is obtained, which makes it possible to obtain an increased size of a hologram screen.

It is preferable that the light diffusing body recorded in the hologram element has an area larger than that of the hologram, which makes it possible to increase the view angle of the hologram screen.

It is preferable that said connecting means is arranged on at least one surface of the hologram, which makes it possible that the hologram device is durable in severe atmospheric conditions.

It is preferable that an adhesive means is provided for connecting said connecting means and the hologram. As a result of this structure, a positively connected condition is obtained between the hologram and the connecting means. Preferably, the adhesive means is made from at least one of an adhesive material or a hot melt material.

It is preferable that an adhesive material is arranged on at least one surface of the hologram. As a result, an application of a hologram to a selected location such as a window glass can be easily done.

In short, in place of a one shot production of a hologram of a large size, production of sectioned holograms which is followed by an integration of the sectioned holograms in a two-dimensional direction is employed according to present invention. Thus, the present invention makes it easy to obtain a hologram screen of an increased size.

However, the above mentioned problem of an uneven color remains unsolved. In order to combat this problem, the inventors has found that a special relationship between the sizes of a light diffusing body and a photo-sensitive member can solve the problem. Namely, according to the solution of the present invention, a size of a light diffusing body is so designed that a spectral characteristic of a diffusion light as obtained during a regeneration of a hologram under a white light size covers the entire wavelength range of a visible light. By this solution, production of a fully colored hologram becomes possible irrespective of a fact that a laser of a single color is used.

It is preferable that a plurality of holograms on which the light diffusing body is recorded are integrally arranged so that the integrated hologram has a size extending in a two dimensional direction.

It is also preferable that the holograms, which are adjacent to each other, are partially overlapped and the overlapped portions are subjected to cutting and a removal. As a result, an integrated hologram of an increased size with no gaps at the seam portions can be obtained.

Furthermore, according to present invention, in order to suppress a color unevenness, the determination of a size of the light diffusing body is done with the following consideration. First, in order to determine the size of the light diffusing body which can cover the entire wave length range of a visible light, a theoretical equation as to hologram imaging is employed to obtain a range of an incident angle of an object light needed in an exposure optical system which allows all of the visible light to be diffracted during the execution of a regeneration process. The details of this process will now be explained.

Namely, FIG. 1 shows an optical system for an exposure of a photo-sensitive member and FIG. 2 shows a regeneration system of the hologram as produced by the system in FIG. 1. In FIG. 1, θr is an incident angle of the reference light 22 introduced into the photo-sensitive member 20 at a point A in a direction transverse to the photo-sensitive member 20, $θ_0$ is an incident angle of the object light 26 introduced into the photo-sensitive member 20 at the point A and $λ_0$ is a wave length of the laser. Furthermore, in FIG. 2, θc is an incident angle of the regeneration light 32 (corresponding to a projection light from a not shown imaging device) introduced into the produced screen hologram 30 at a point C in a direction transverse to the hologram 30, θi is an angle of a diffraction light 34 emitted from the screen hologram 30 in a direction as shown by an arrow (direction transverse to the hologram 30), and λc is a wave length of a diffraction light 34. In this case, the following equations are obtained.

$$\sin θ_i = \sin θc + \mu(\sin θ_0 - \sin θr) \quad (1)$$

$$= λ_c/λ_0 \quad (2)$$

In the above equations, at the point A of the photo-sensitive member and at the point C of the hologram 30 which corresponds to the point A, and θr anc θc are constant. The laser wave length $λ_0$ is, in case of, for example, an argon laser, 514.5 nm. Furthermore, when the emitting angle θi of the diffusion light 34 is determined to a desired value of, for example, 0°, the above equation (1) decides a desired relationship between the $θ_0$ and θc. By using this equation, a range of the incident angle $θ_0$ can be determined in such a manner that the wave length λc of the diffraction light emitted from the entireity of the screen hologram 30 during the execution of the regeneration process covers the visible wave length area, by which a determination of a desired size S of the light diffusing body 24 can be done.

In this case, a difference S1+S2 between the length M of a side of a photo-sensitive member 20 and a length S of a light diffusing body 24 must satisfy the following equations, under the limitation that the wave length of the visible light is in a range between 380 and 780 nm.

$$S_1 \geq L \times \tan(\sin^{-1}((\sin θ_i - \sin θc) \times (λ_0/λ_{c2}) + \sin θr) - M_1, \text{ and}$$

$$S_2 \geq L \times \tan(\sin^{-1}((\sin θ_i - \sin θc) \times (λ_0/λ_{c1}) + \sin θr) - M_2.$$

Thus, according to present invention, due to a selection of a size of the light diffusing body as determined by the above equations, a screen hologram can be produced of a highly increased view area, while preventing an unevenness from being generated even when a recording to a photo-sensitive member is done by a single color laser. Namely, by using this method for a designing of a hologram, the wave length of the diffraction light over the entire surface of the hologram can cover the visible wave length. Thus, an image with color can be properly generated on the screen by using an imaging device such as a projector.

As explained above, according to present invention, a plurality of sectioned holograms are integrated so as to provide an integrated hologram extended in a two-dimensional direction. However, the following problem is encountered during the execution of an exposure of a photo-sensitive member in an optical system. Namely, during an exposure of a photo-sensitive member, the central point C of the photo-sensitive member 20 should be located in an "exposure horizontal surface", in which the axis 22a of the reference light 22 and the axis 26a of the object light 26 should be located. A relative arrangement between the photo-sensitive member 20, the axis 22a of the reference light and the axis 26a of the object light 26 as viewed in a direction as shown by α in FIG. 3 is the same as that shown in FIG. 53 except that the photo-sensitive member, the axis of the reference light and the axis of the object light are shown by 120, 118a and 117a, respectively, in FIG. 3.

However, in the case of the integrated arrangement of the sectioned holograms extended in the two-dimensional direction, the central points C1 and C2 of the respective sectioned photo-sensitive members each constructing the sectioned hologram are shifted upwardly or downwardly with respect to the central point C of the photo-sensitive member 20 prior to the division. Thus, the axis 22c of the reference light 22 which connects the diverging point 22b of the reference light 22 and the central point C1 or C2 of the sectioned photo-sensitive member 20a is inclined with respect to the "exposure horizontal plane". This means that an arrangement must be made such that the reference light 22 is introduced into the photo-sensitive member at an inclined angle θs, which, on one hand, makes the design of the optical system for an exposure to be complicated and makes it likely that an observer or operator is blinded by a laser light during a necessary adjustment process of the optical system on the other hand.

In order to combat this problem, according to present invention, a solution is proposed, wherein the exposure of the photo-sensitive member is done by rotating, in the system, the photo-sensitive member and light diffusing body about an axis of the photo-sensitive member for the same angle in such a manner the optical system for an exposure of the photo-sensitive member is kept horizontal. As a result, even in a case where an exposure is done by dividing, vertically, a photo-sensitive member, it is possible that the whole exposing operation of the divided photo-sensitive members is done by the optical system maintained in the horizontal plane.

It is preferable that the rotating movement of the photo-sensitive member and the light diffusing body is done independently about the each of three axis which are orthogonal with each other. As a result, an exposure process for all of the sectioned photo-sensitive member is easily done by the optical system kept in a horizontal plane. Furthermore, in a situation where a parallel beam of a width larger than the size of a light diffusing body cannot be produced, an exposure of the photo-sensitive member is possible.

Furthermore, an object light for illuminating a light diffusing body during an exposure of a photo-sensitive member is introduced obliquely to the photo-sensitive member form a location outside the "exposure horizontal plane", which makes it, in the conventional arrangement, difficult to properly arrange the optical system and makes likely that the laser beam is emitted in an unpredictable direction. These problems are not likely to be generated according to the present invention, since the optical system for the exposure is easily arranged on the "exposure horizontal plane".

It is preferable that an exposure of the photo-sensitive member is done in such a manner that the unnecessary part of at least the light diffusing body is made to be opaque. As a result, an exposure of all of the sectioned photo-sensitive members can be executed without rotating a photo-sensitive member and a light diffusing body each time when a hologram is produced, thereby highly simplify the setup of the optical system for executing the exposure of the photo-sensitive member.

BRIEF EXPLANATION OF ATTACHED DRAWINGS

FIGS. 14a and 14b, 15a and 15b and 16a and 16b illustrate a different embodiment for a unification of sectioned holograms.

Figure 17:
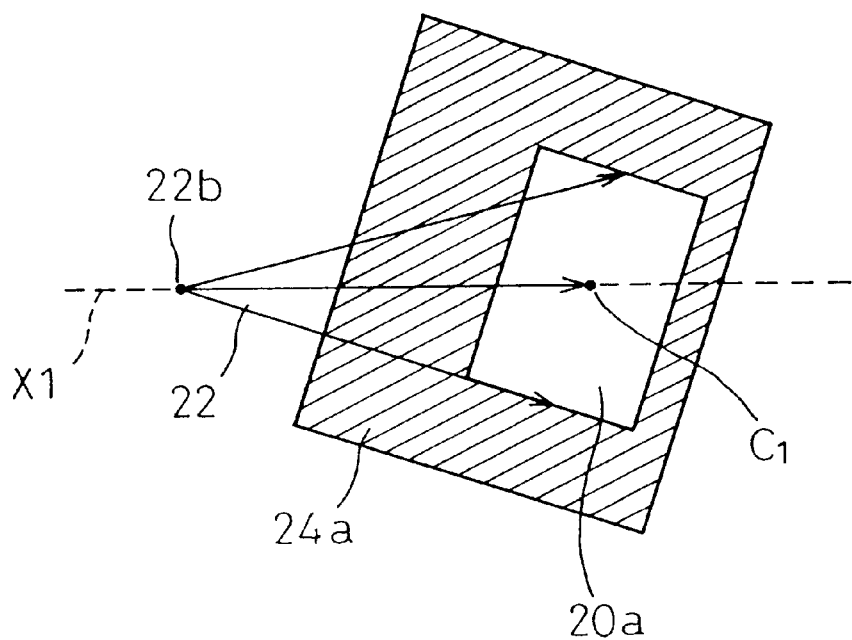

FIG. 17 is a partial side view of an optical system for an exposure of a photo-sensitive member after the completion of an adjustment to a "exposure horizontal surface".

Figure 18:
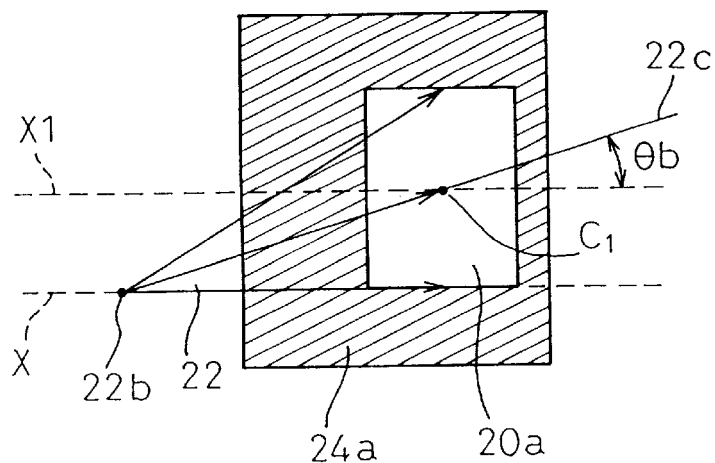

FIG. 18 is the same as to FIG. 17 but shows prior to the execution of a rotating movement of the photo-sensitive member.

Figure 19:
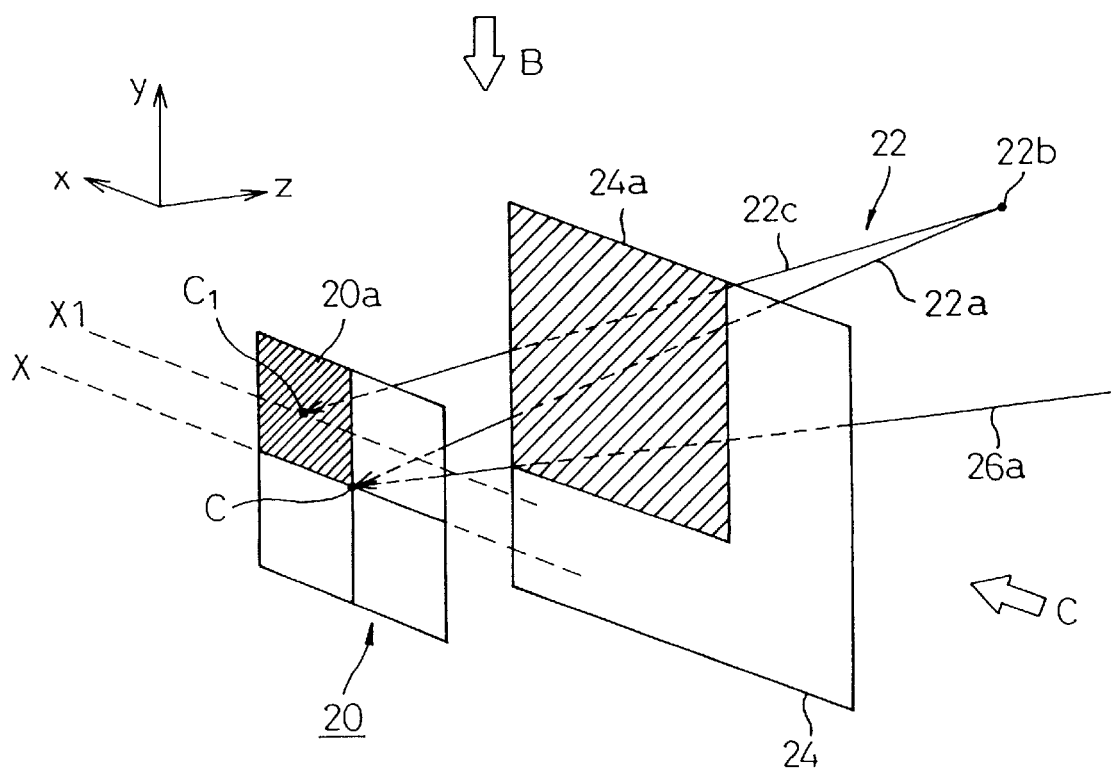

FIG. 19 is a partial, schematic, perspective view of an optical system for an exposure of divided photo-sensitive members.

Figure 20:
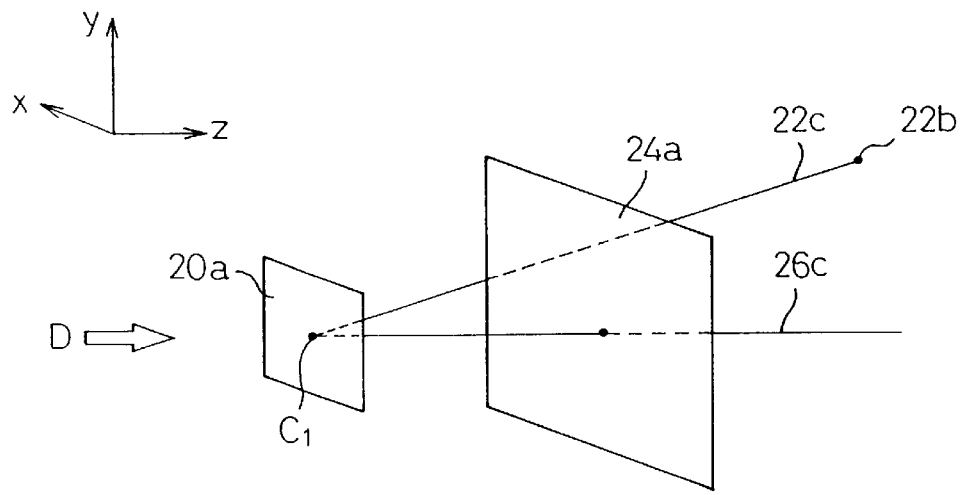

FIG. 20 is similar to FIG. 19 but illustrate a different embodiment.

FIGS. 21 to 27 is side views of the optical system in FIG. 20 and illustrates various stages during an exposure of divided photo-sensitive members.

Figure 28:
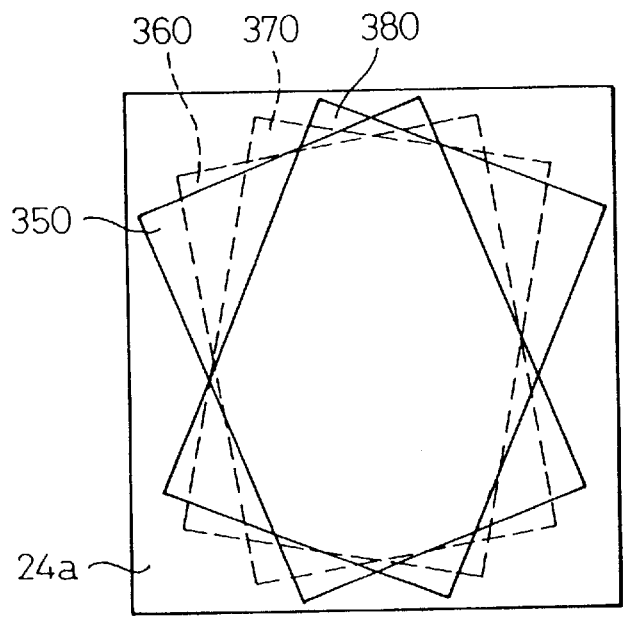

FIG. 28 shows a relationship between a photo-sensitive member and a light diffusing body in a different embodiment.

Figure 29:
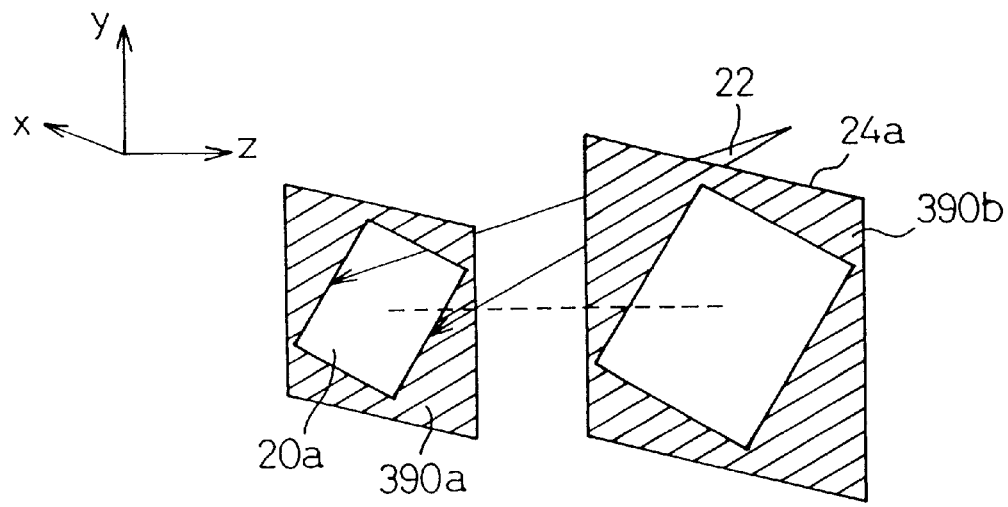

FIG. 29 is a perspective view of the optical system in FIG. 28.

Figure 30:
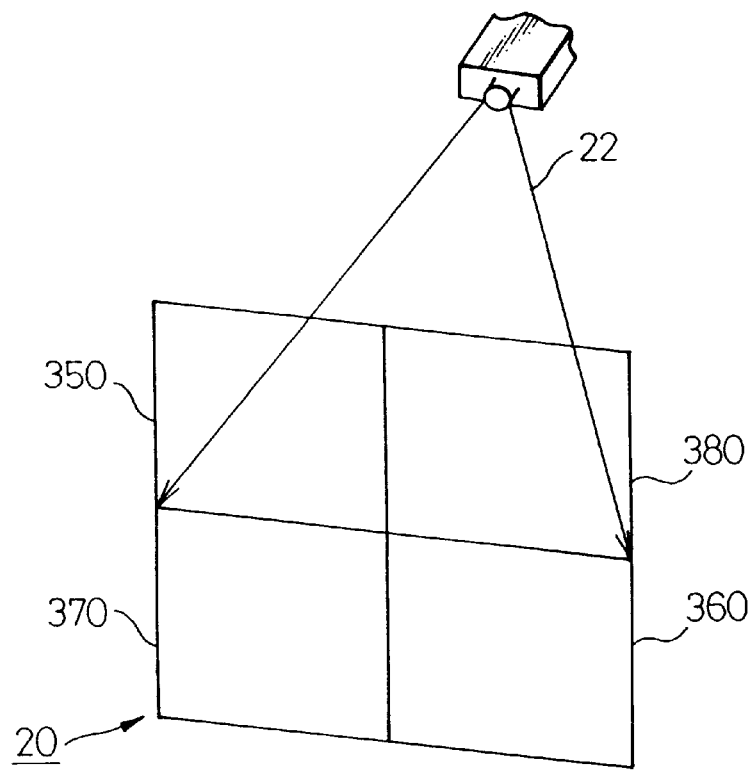

FIG. 30 is a partial, schematic, perspective view of an exposure system in a different embodiment.

Figure 31:
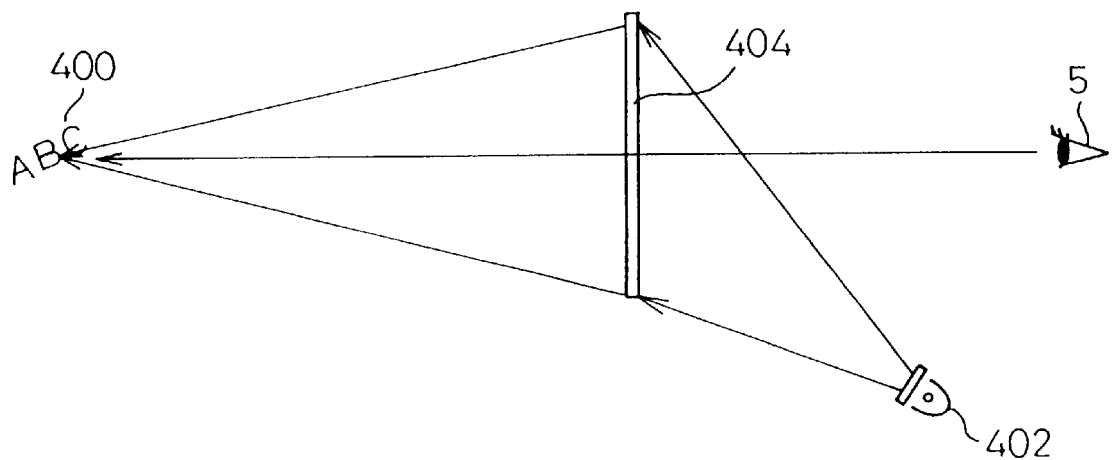

FIG. 31 is a schematic, side view of a display system in a different embodiment.

Figure 32:
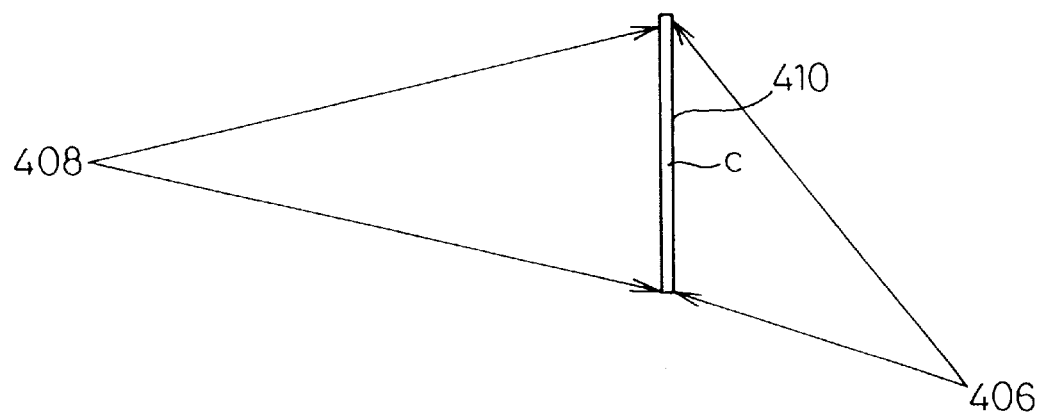

FIG. 32 is a schematic, side view of an optical system for an exposure to produce a hologram used in the system in FIG. 31.

Figure 33:
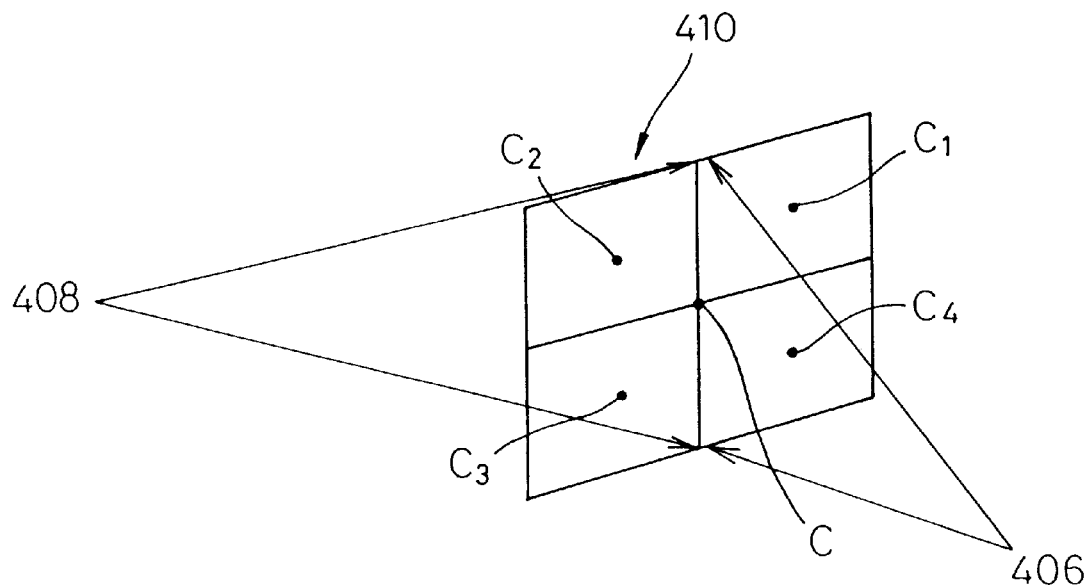

FIG. 33 is a perspective view of the optical system in FIG. 32.

Figure 34:
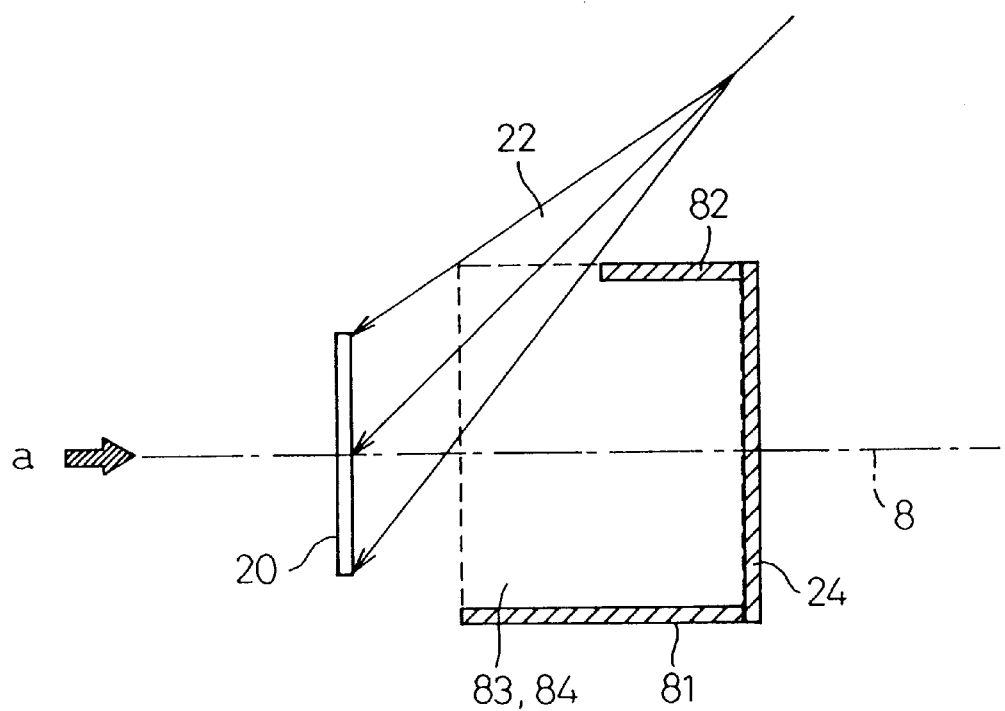

FIG. 34 is a side, partially sectioned view of an optical system for an exposure in a different embodiment.

Figure 35:
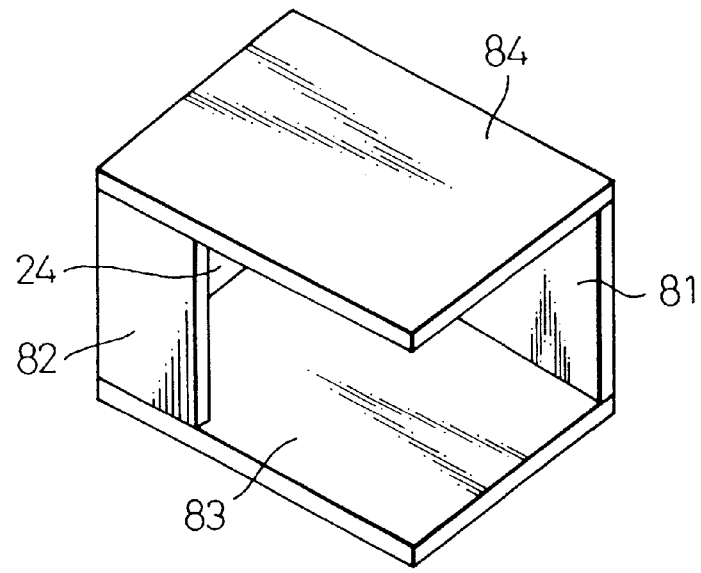

FIG. 35 is a perspective view of an assembly of a light diffusing body in the system in FIG. 34.

Figure 36:
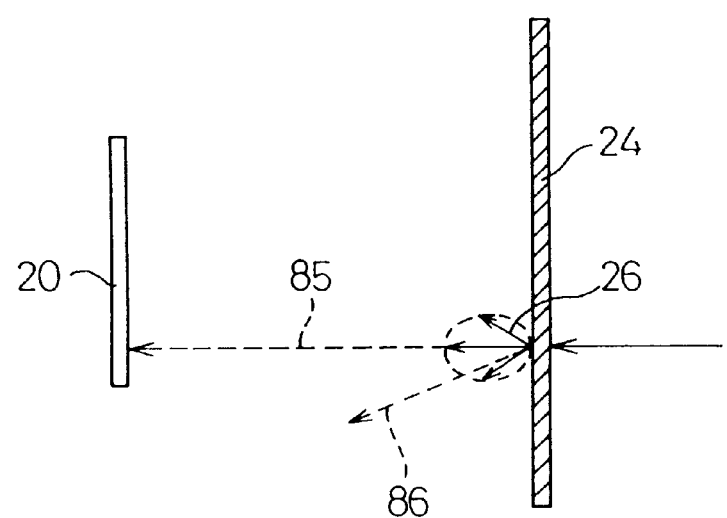
Figure 37:
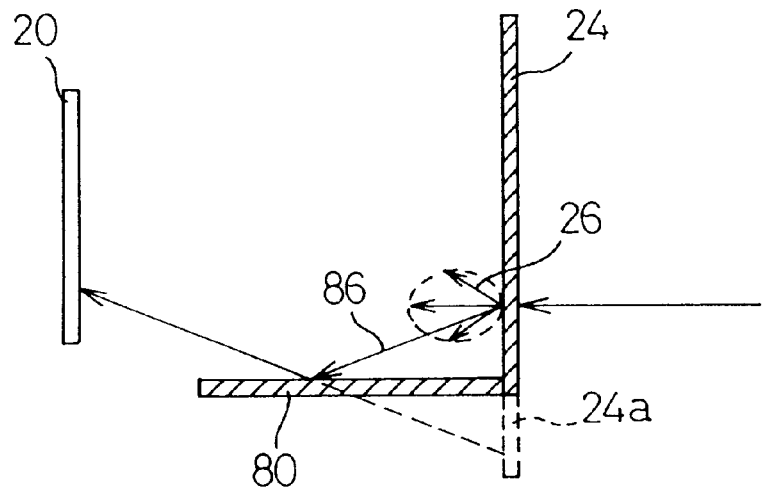
Figure 38:
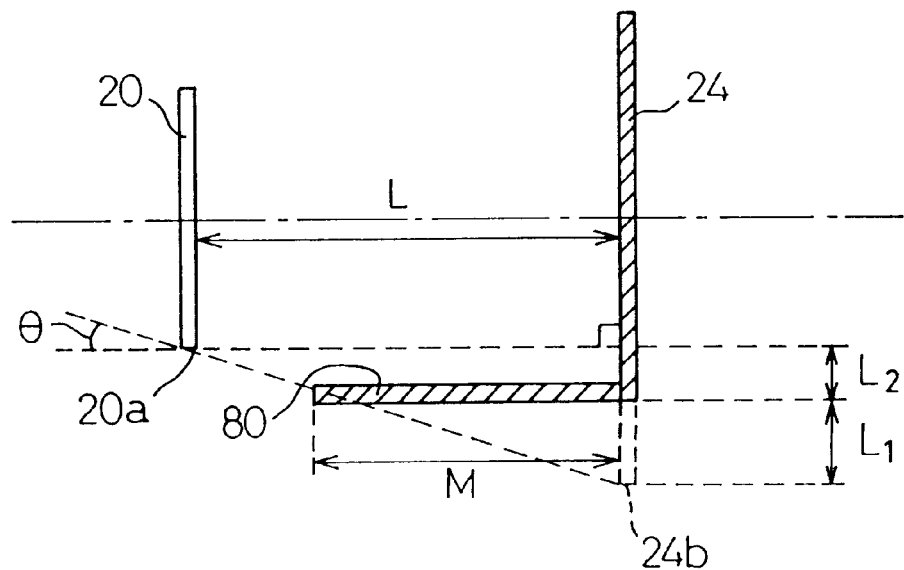
Figure 39:
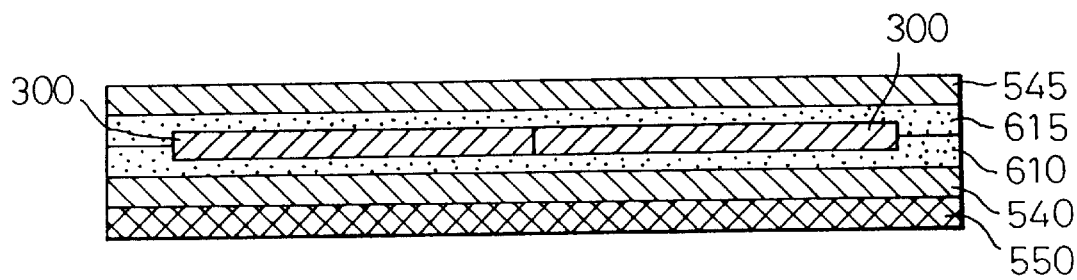
Figure 40:
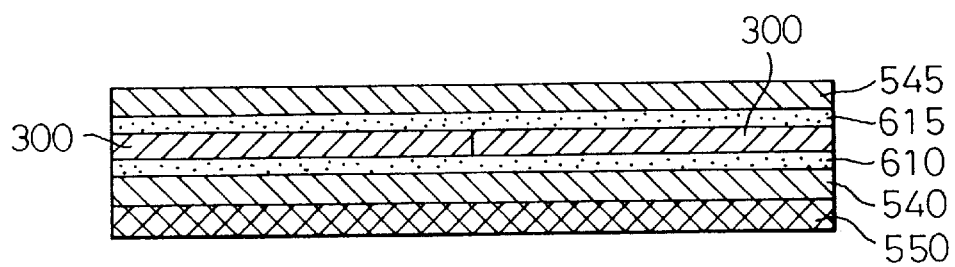
Figure 41:
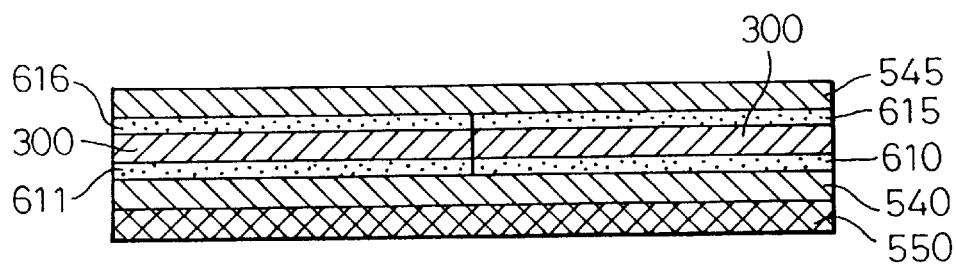
Figure 42:
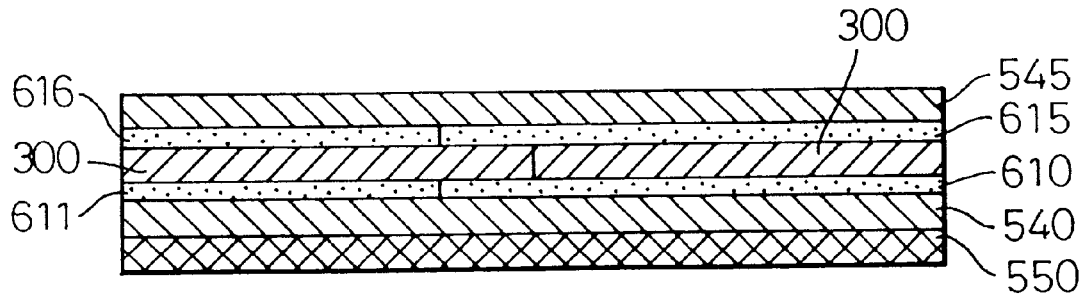
Figure 43:
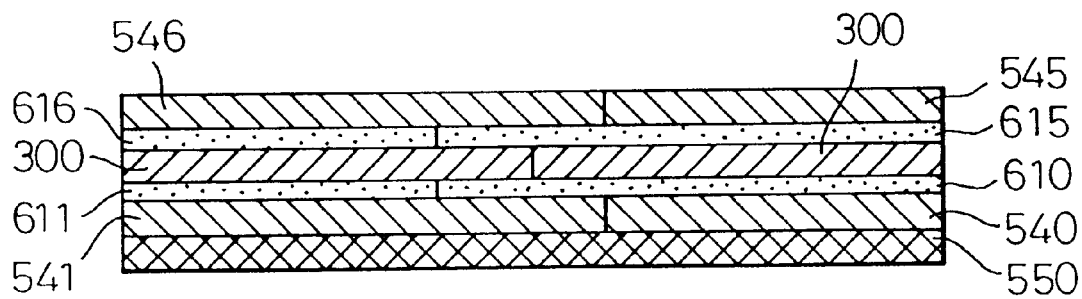
Figure 44:
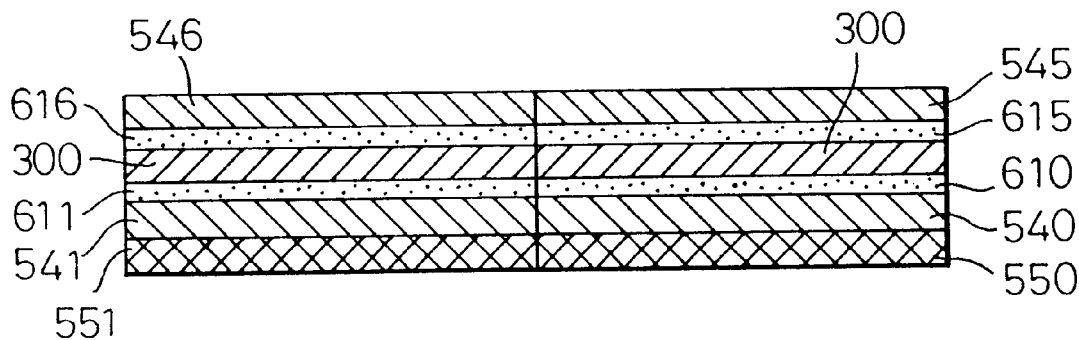
Figure 45:
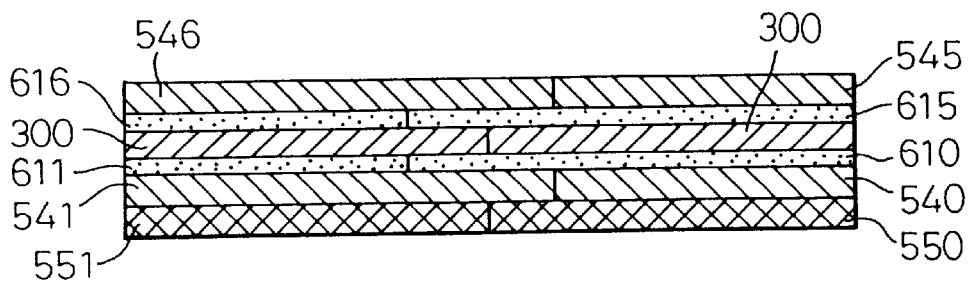
Figure 46:
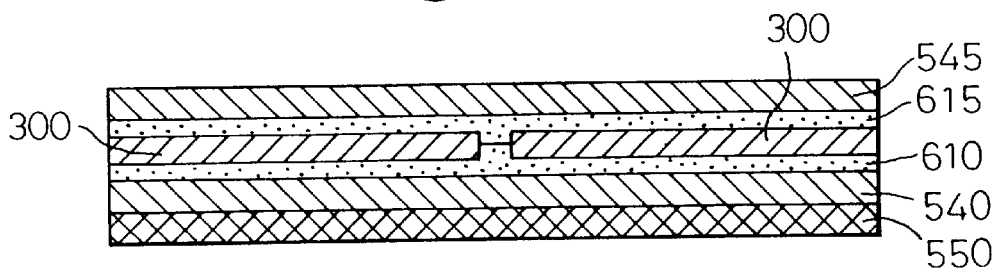
Figure 47:
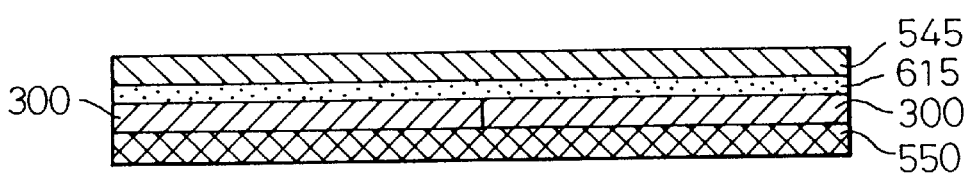
Figure 48:
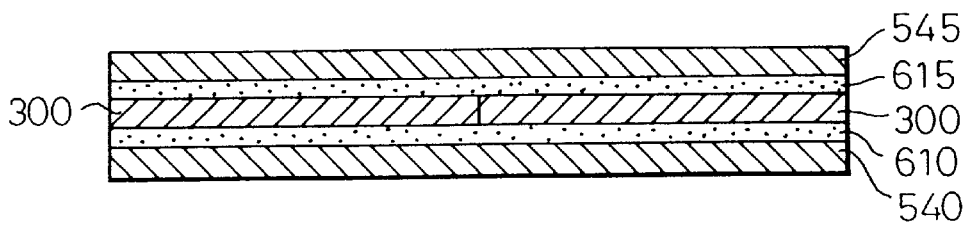

FIGS. 36 to 38 are partial, side views of the exposing system in FIG. 34 and illustrate the operation of the embodiment.

FIGS. 39 to 48 illustrate cross sectional views of various modifications of a hologram in a different embodiment.

Figure 49A:
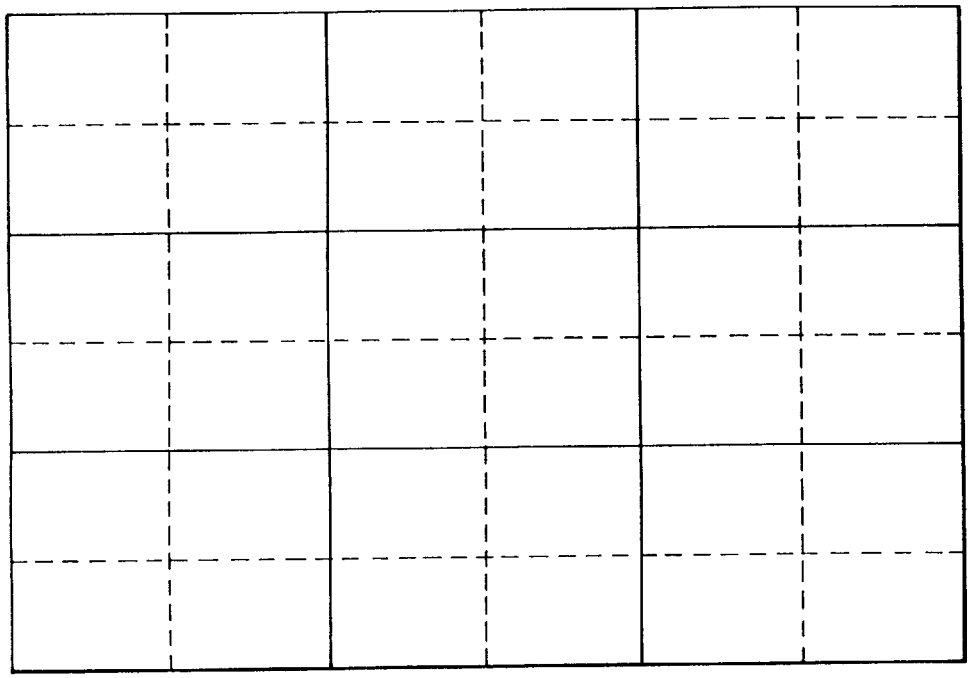

FIG. 49a is a plan view of a hologram in a different modification.

Figure 49B:
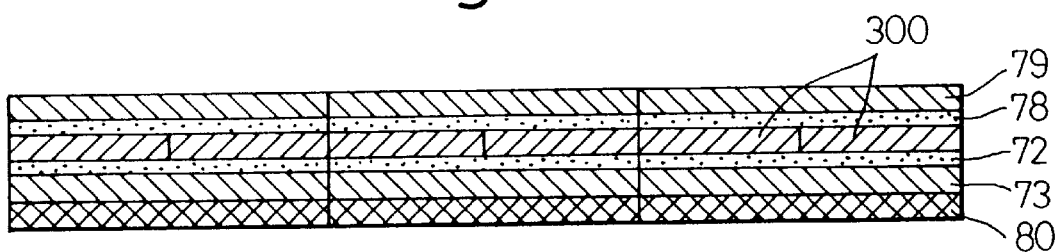

FIG. 49b is a cross sectional view of the hologram in FIG. 49a.

Figure 50:
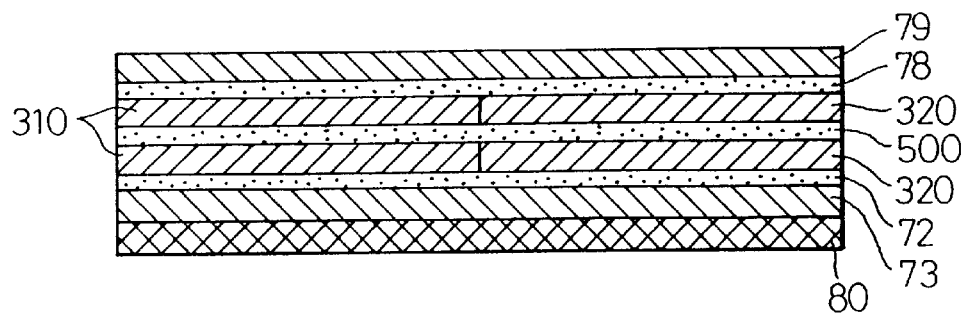

FIG. 50 illustrates a cross sectional view of a hologram in a modification.

Figure 51A:
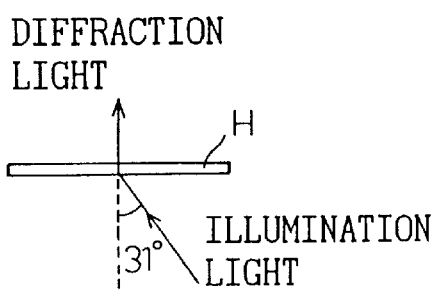

FIG. 51a is a method for measuring a spectral characteristic of the hologram in FIG. 50.

Figure 51B:
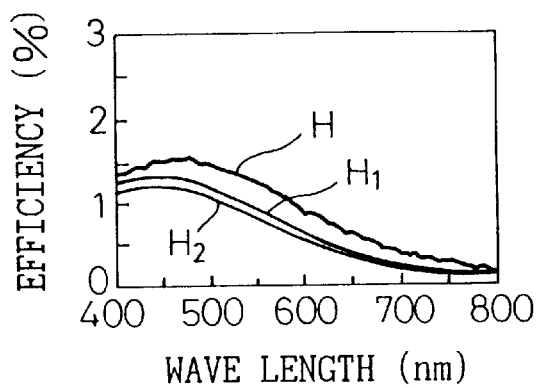

FIG. 51b shows relationships between a regeneration wave length and an efficiency.

Figure 51C:
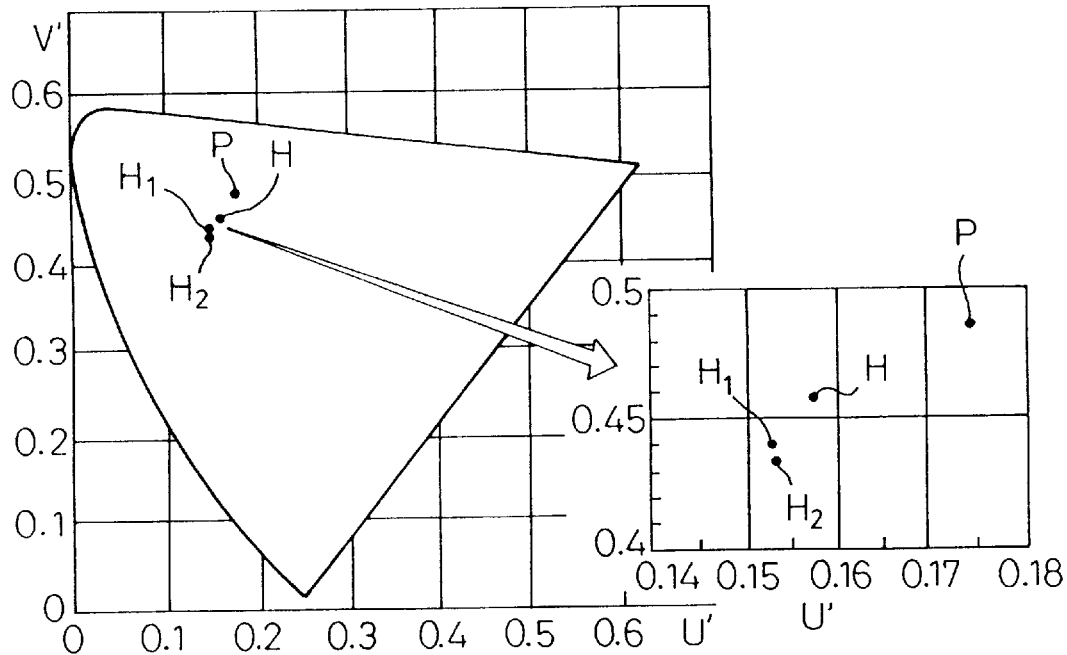

FIG. 51c shows chromaticicity diagrams.

Figure 52:
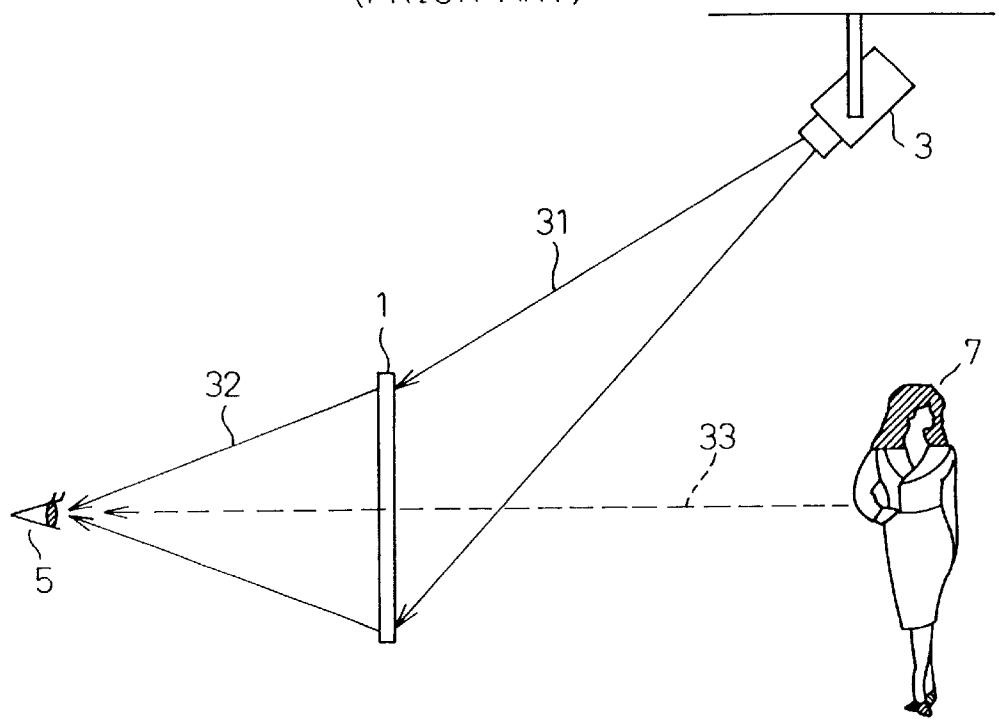

FIG. 52 is a schematic view of a display system in a prior art.

Figure 53:
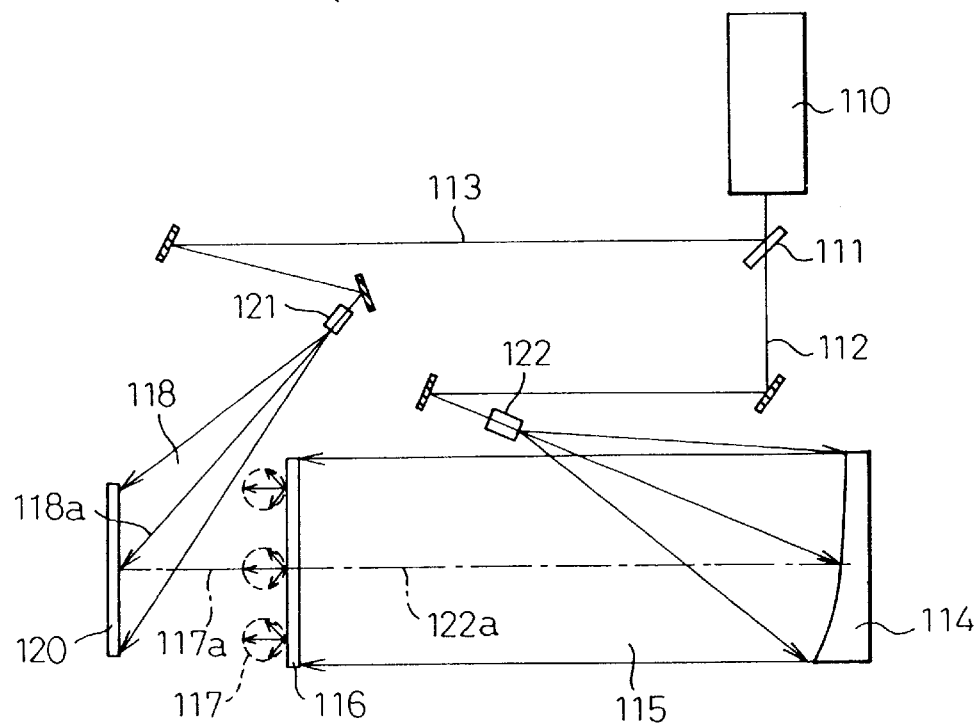

FIG. 53 is a schematic view of an optical system for producing a hologram.

Figure 54:
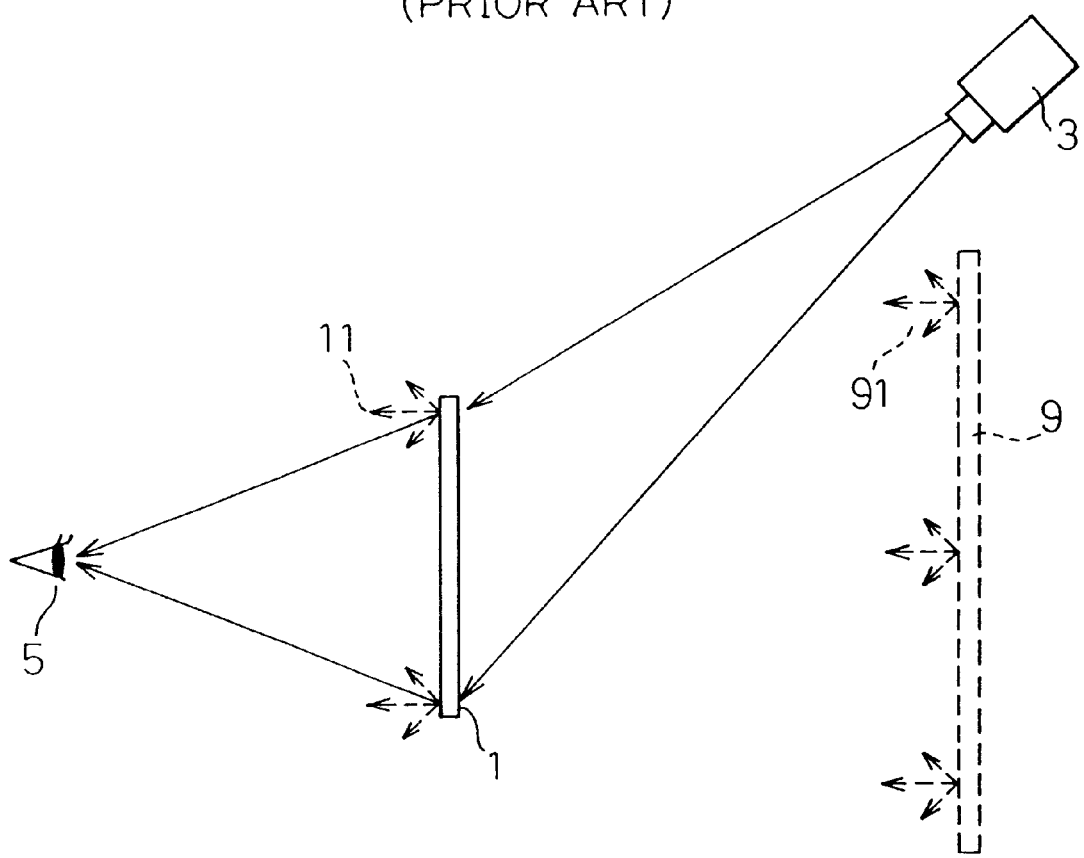

FIG. 54 is a schematic illustration of a regeneration of a hologram in the prior art.

Figure 55:
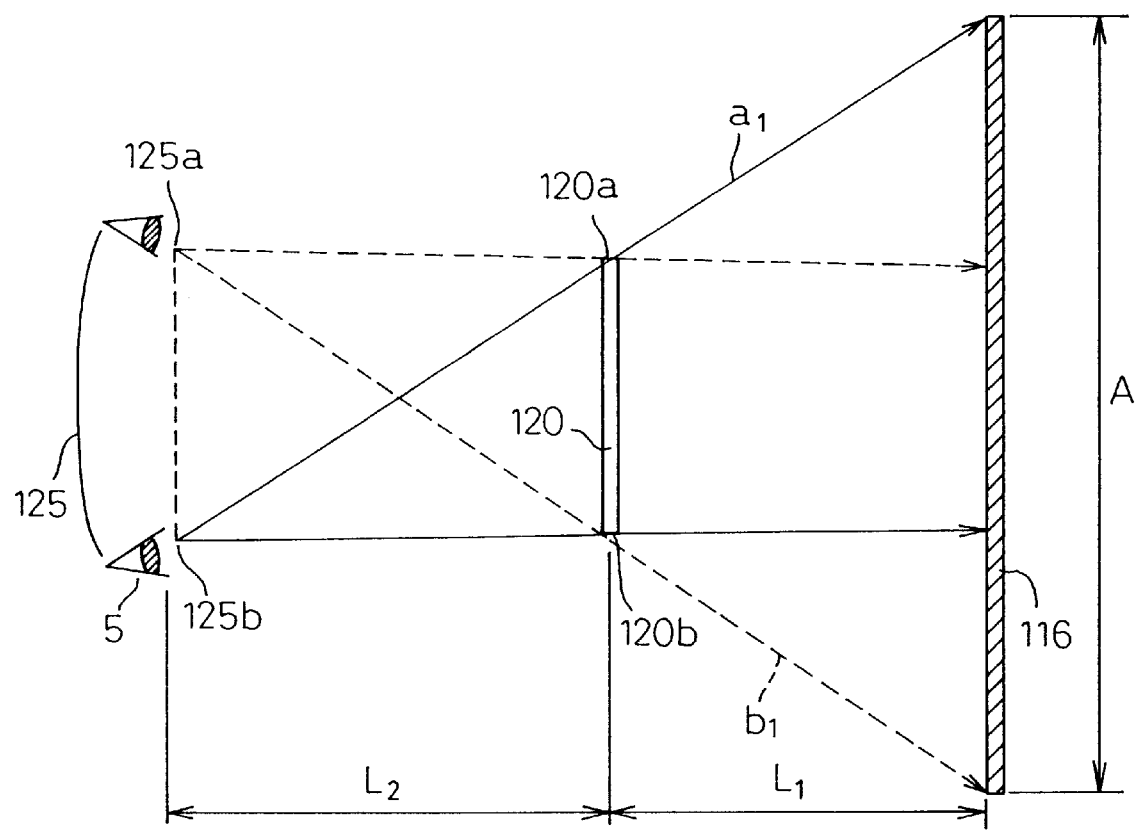

FIG. 55 is a illustration of a relationship between the sizes of a view range (angle) and a light diffusing body.

DESCRIPTION OF PREFERRED EMBODIMENTS

First Embodiment

Figure 4:
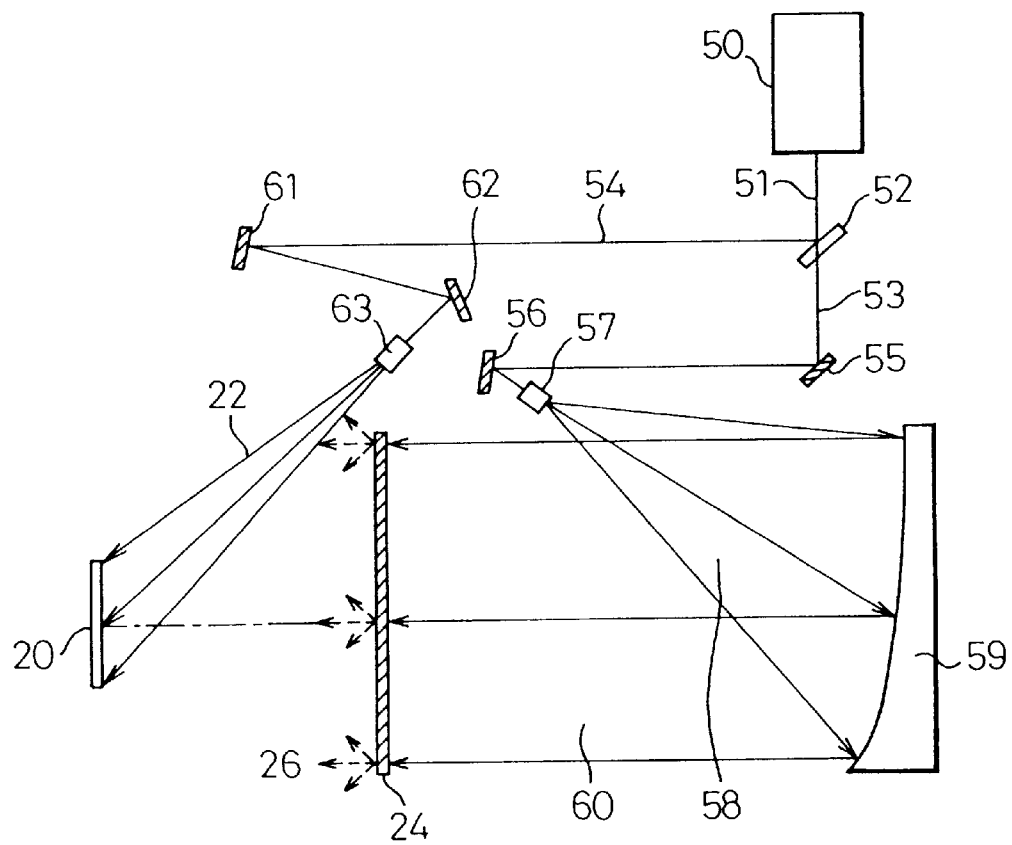
FIG. 4 is an entire plan view of an optical system for an exposure of a photo-sensitive member according to present invention.

Now, embodiments of the present invention overcoming the above mentioned difficulty will be explained. FIG. 4 shows an optical system for an exposure according to present invention, which includes a laser beam generator 50 for generation of a laser beam 51 which is directed to the beam splitter 52, whereat the laser beam 51 is divided to two beams, a first beam 53 and a second beam 54. The first beam 53 is directed via a first mirror 55 and a second mirror 56 to a first object lens 57 by which an expanded beam 58 is created. This expanded beam 58 is directed to an off-center parabolic surface concave mirror 59 so that a horizontal parallel beam 60 is obtained, which passes through a light diffusing body 24. The passage of the parallel beam through the light diffusing body 24 causes an object light 26 to be generated, which illuminates a photo-sensitive member 20.

The other laser beam 54 is directed, via a third mirror 61 and a fourth mirror 62, to a second object lens 63, where a diverged light 22 as a reference light is obtained, which illuminates the photo-sensitive member 20.

At a photo-sensitive member 20, interference is generated between the reference light 22 and the object light 26, which causes fringes to be recorded in the photo-sensitive member 20.

Furthermore, in this first embodiment, on a surface of the photo-sensitive member 20 opposite the surface to which the reference light 22 is introduced or on both surfaces of the photo-sensitive member 20, an anti-reflection (AR) glass (not shown) is attached via an index matching liquid, thereby preventing a generation of interference fringes which are otherwise generated by a noise light.

The laser beam generator 50 is, for example, constructed as an argon laser generating a laser beam of a wave length of 514.5 nm. The photo-sensitive member 20 is, for example, formed from a material such as a photopolymer or dichrome gelatin. Furthermore, the light diffusing body 24 is, for example, constructed from a frosted glass or opal glass.

In the above mentioned construction of the optical system, a positional relationship between the photo-sensitive member 20 and the light diffusing body 24, a size of the light diffusing body 24 and an incident angle of and an incident distance from of the reference light 22 are critical factors, as will fully explained hereinbelow.

A relationship between sizes of the photo-sensitive member 120 and the light diffusing body 116 for generating a desired view area (view angle) was already explained, with reference to FIG. 55, by a single shot exposure process in the prior art. In the first embodiment shown in FIG. 5 of the present invention, the hologram is divided to an upper and lower portions. However, it is necessary that each of the divided portions has a desired value of view angle (range).

A size of the diffusing body 24, by which the necessary view angle is obtained, is determined as follows. Namely, referreng to FIG. 5 the size of the light diffusing body 24 for satisfying the view angle of the upper, divided hologram 30 after it is subjected to a division is one which extends between a point where a line a connecting the lower end 125b of the view range 125 with the upper end 30a of the hologram 30 intersects with a vertical plane P of the light diffusing body 24 and a point where a line b connecting the upper end 125a of the view range 125 with the lower end 30b of the hologram 30 intersects with a vertical plane P of the light diffusing body 24. In other words, the optical system in FIG. 4 is such that a positional relationship between the photo-sensitive member 20 and the light diffusing body 24 which exactly corresponds to the relationship between the hologram 30 and the light diffusing body 24 as shown in FIG. 5 is obtained.

Figure 5:
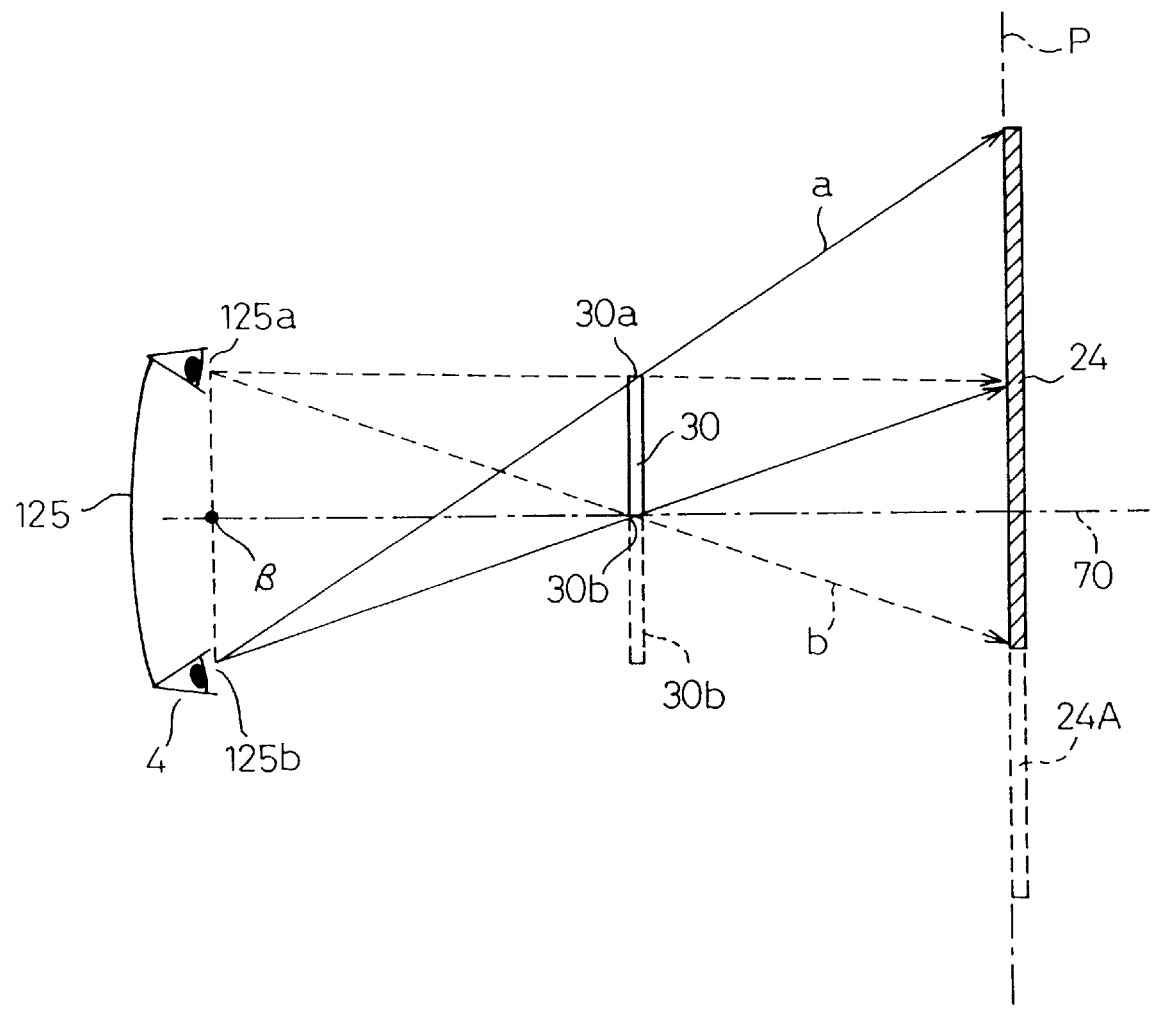
FIG. 5 is a partial view of an optical system for a regeneration of a hologram and illustrates a relationship of a size between the view range and the light diffusing body.

For the lower divided part 30b of the hologram at the lower side, an arrangement between the photo-sensitive member 20 in FIG. 4 and the light diffusing body 24 in FIG. 4 provides an arrangement of the hologram 30 in FIG. 5 and the light diffusing body 24 in FIG. 5 which is symmetrical with respect to the axis 70 connecting the central point B of the view area 125.

According to the exposure system where a division of the hologram to the upper and lower parts as explained with reference to FIG. 5, the size of the light diffusing body is reduced to the a length shown by a dotted line 24A in FIG. 5. Thus, an increase in an intensity of the reference light 22 and the object light 26 in FIG. 4 is obtained, which makes the exposure of the photo-sensitive member 20 easy.

Figure 6:
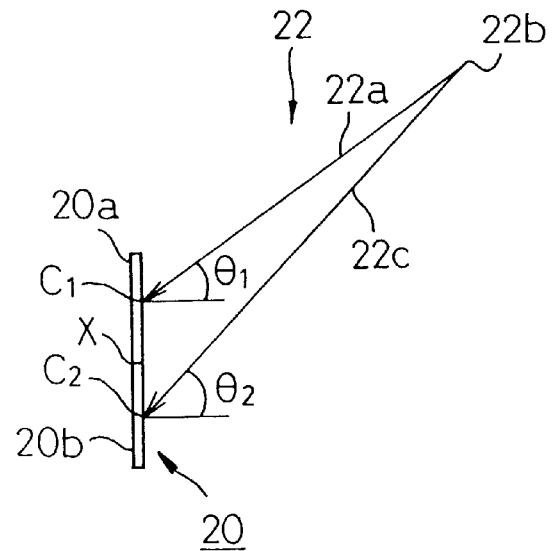
FIG. 6 is a partial, side view of an optical system and illustrating a problem as encountered during an execution of an exposure of vertically divided photo-sensitive members.

Now, a relationship between the incident angle and an incident distance will be explained with reference to FIG. 6. In FIG. 6, the photo-sensitive member 20 is in a condition prior to the division. A diverging point of the reference light 22 is designated by a point 22b. The photo-sensitive member 20 is divided along a line X to an upper part 20a and a lower part 20b. The upper part 20a has a central point C1, while the lower part 20b has a central point C2. An incident distance of the reference light 22 to the upper portion 20a is a distance between the diversion point 22b and the central point C1 along the axis 229 which connects the point 22b and the center C1. Furthermore, an incident angle of the reference light 22 to the hologram upper part 20a is designated by $\theta_1$. In a similar way, the incident distance of the reference light 22 to the lower part 20b of the photo-sensitive member 20 is a distance between the central point C2 and the diverging point 22b along the axis 22c connecting points C2 and 22b. Furthermore, the incident angle of the reference light 22 to the hologram lower part 20b is designated by $\theta_2$.

In short, a production of the divided type hologram is possible by an the optical system as shown in FIG. 4, while keeping an arrangement between the diverging point 22b of the reference light 22 and the positions of the upper part and lower part holograms 20a and 20b, i.e., keeping the incident distance and the incident angle.

Now, a relationship between the sizes of the photo-sensitive member and the light diffusing body for suppressing unevenness in color in the light diffusing body recorded in the hologram will be explained with reference to FIGS. 1 and 2.

Figure 1:
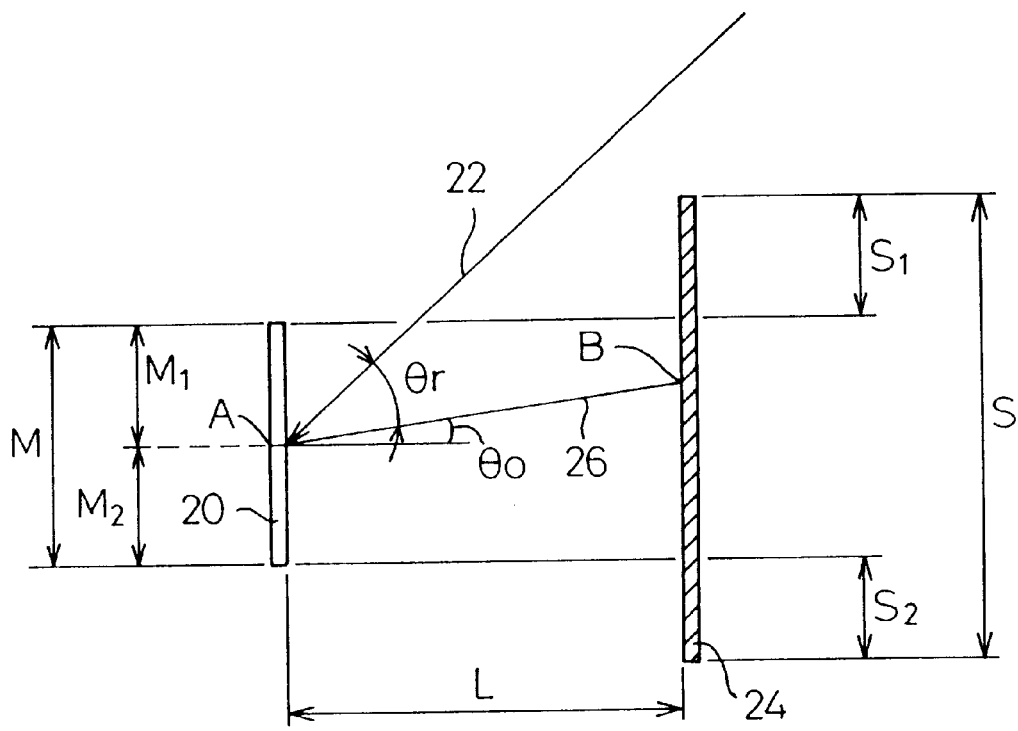
FIG. 1 is a partial view of an optical system for an exposure of a photo-sensitive member.
Figure 2:
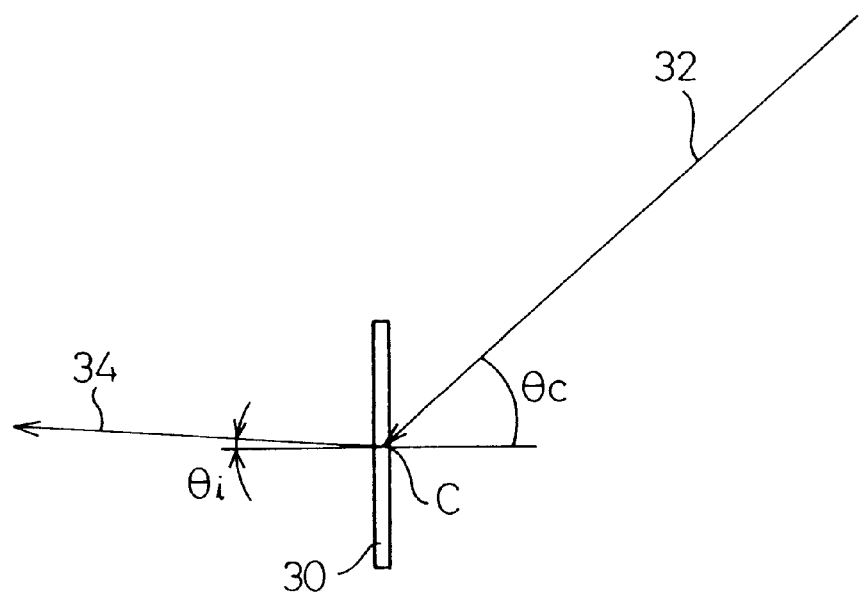
FIG. 2 is a partial view of an optical system for a regeneration of the hologram as obtained by the system in FIG. 1.
Figure 3:
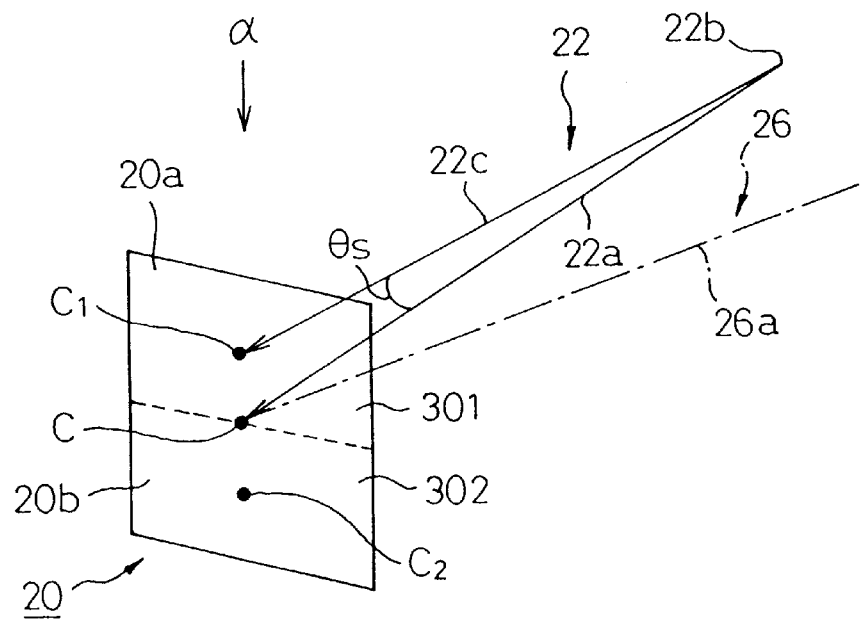
FIG. 3 is a partial, schematic, perspective view of the optical system for an exposure of the photo-sensitive member.

In FIGS. 1 and 2:

$\theta r$ is an incident angle of the reference light 22 to the photo-sensitive member 20;

$\theta_O$ is an incident angle of the object light 26 from the light diffusing body 24 introduced into the photo-sensitive member 20;

$\theta c$ is an incident angle of the re-generating light 32 introduced into the hologram 30 as produced;

$\theta_i$ is an exit angle of the diffraction light 34 from the hologram 30;

L is a distance between the light diffusing body 24 and photo-sensitive member 20 during a recording to the photo-sensitive member 20;

S is a length of a side of the light diffusing body 24;

M is a length of a side of the photo-sensitive member 20;

$S_1$ is a difference in the lengths of the light diffusing body 24 and the photo-sensitive member 20 on the side adjacent the inlet side of the reference beam 22;

$S_2$ is a difference in the lengths of the light diffusing body 24 and the photo-sensitive member 20 on the side opposite the inlet side of the reference beam 22;

$M_1$ is a distance between an end of the photo-sensitive member 20 adjacent the inlet side of the reference light 22 and the point A of the photo-sensitive member 20 where the reference light 22 is introduced; and $M_2$ is a distance between an end of the photo-sensitive member 20 opposite the inlet side of the reference light 22 and the point.

According to present invention, in order to obtain a desirable efficiency along the entire range of the wave length at least at a visible light area, the inventor has found that the following equations should be satisfied:

m is a difference between the side length of the diffusing body 24 and the side length of the photo-sensitive member (m=S−M=$S_1$+$S_2$).

$$S_1 \geq L \times \tan(\sin^{-1}((\sin \theta_i - \sin \theta c) \times (\lambda_O/\lambda_{c2}) + \sin \theta r) - M_1 \quad (3)$$

$$S_2 \geq L \times \tan(\sin^{-1}((\sin \theta_i - \sin \theta c) \times (\lambda_O/\lambda_{c1}) + \sin \theta r) - M_2 \quad (4)$$

$\lambda_O$ is a wave length of the laser beam during the recording;

$\lambda c$ is a wave length in the diffracted direction $\lambda_1$, where ?c is in a range $\lambda_{c1}$ to $\lambda_{c2}$ and $\lambda_{c1}$ is 380 nm and $\lambda_{c2}$ is 780 nm.

In working the present invention, the incident angle $\theta r$ of the reference light to the photo-sensitive member is 35°; the incident angle $\theta_O$ of the object light into the photo-sensitive member is in a range between −31.3 to 27.3°; the incident angle of the regeneration light to the hologram $\theta c$ is 35°; the diffraction angle $\theta_i$ of the regenerating light by the hologram $\lambda_i$ is ±10°; the laser beam wave length $\lambda_O$) is 514.5 nm for the recording; the wave length $\lambda c$ for regeneration is in a range between 380 to 780 nm; the distance L between the diffusing body and the photo-sensitive member during the recording is 780 mm; and the length M of a side of the photo-sensitive member is 300 mm. In this case, from the above equations, a side length S of the light diffusing body 24 of a value of 790 mm is determined.

According to this arrangement of the present invention, regeneration with color within the desired viewing area was possible in such a manner that a color matching is obtained at a seam zone between the divided parts of the hologram.

In more detail, in the structure of the above embodiment, a determination of the desired size and position of the diffusing body becomes possible in such a manner that, within the total range of the exit angle θi of the diffraction light 34 in FIG. 2 which is determined in accordance with the required view range, the wave length λc of the diffraction light 34 is in the range of visible wave length.

In an optical system for an exposure after the division of the light diffusing body, the light for illuminating the divided diffusing body may not necessarily be a parallel beam. In other words, a diverging beam can be used. In this case, it is necessary that the diffusing capacity of the diffusing body must provide a wide range of the divergence, so that an incident angle of the diverging light to an end of the diffusing body is smaller than the angle which corresponds to an increase in the diffusing capacity of the diffusing body.

Figure 7:
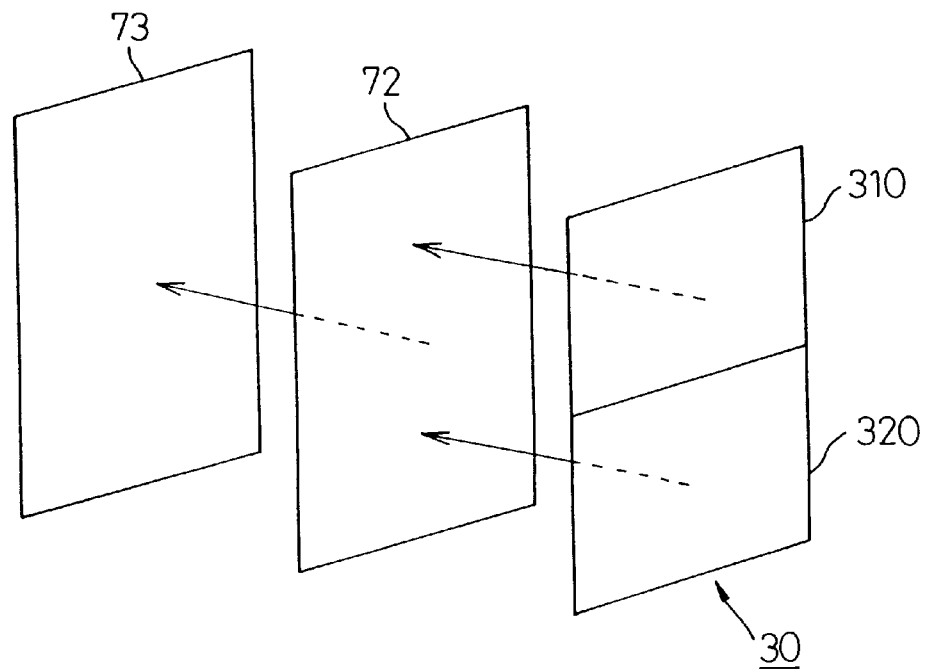
FIG. 7 is a partial, schematic, perspective view illustrating a relationship between sectioned holograms and a base plate for an integration of the holograms.

FIG. 7 shows a hologram device 30 which is constructed by the upper and the lower holograms 310 and 320 as constructed above, which are arranged without any gap at a seam. The holograms 310 and 320 are applied to a base plate 73 such as a resin plate or a resin sheet (cover film) is applied to via an adhesive layer 72 as connecting means, thereby completing the production of a single hologram of an increased size having a desired view range, which can be used for an application for a display purpose at, for example, a show window. A method for production of a hologram device covered by such cover films will be explained by reference to FIGS. 8 to 13, which illustrate steps for realizing the method.

Figure 8:
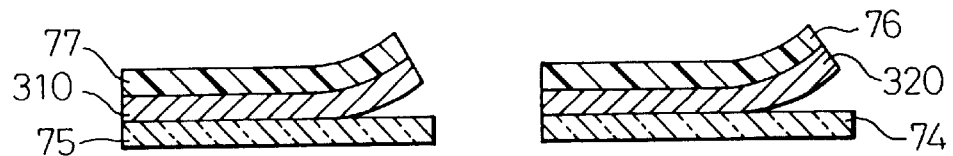
FIGS. 8 to 13 illustrate a method for an integration of sectioned holograms.

As well known, the photo-sensitive member during the exposure process by means of an optical system in FIG. 4 for a formation of a hologram is, by means of an adhesive, held between a bottom glass plate and a top transparent film so that the photo-sensitive member is protected from being damaged. Thus, at the first step as shown in FIG. 8, the hologram 310 and 320 together with the top protection films 76 and 77 are stripped from the glass base plates 74 and 75. Then, the upper hologram 310 and the lower hologram 320 to be connected are carefully placed under a side by side relationship, so that no gap is left at a seamed portion, while the holograms 310 and 320 are located above the transparent films 76 and 77. Furthermore, the base plate 72 is located above the holograms 310 and 320, which are under end-to-end contacted condition, while the adhesive layer 72 is located above the adhesive layer 73.

The adhesive layer 73 is formed from at least one kind of hot melt material selected from ionomer resin, ethylene resin, ethylene-ethyl acrylate copolymer resin and ethylene-vinyl acetate copolymer resin. Furthermore, the adhesive layer 73 is made from a material such as a polyethylene terephthalate (pet).

Figure 9:
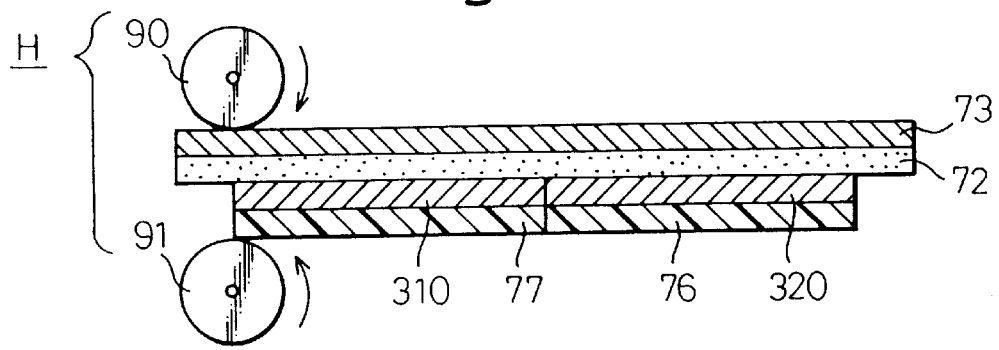
Figure 10:
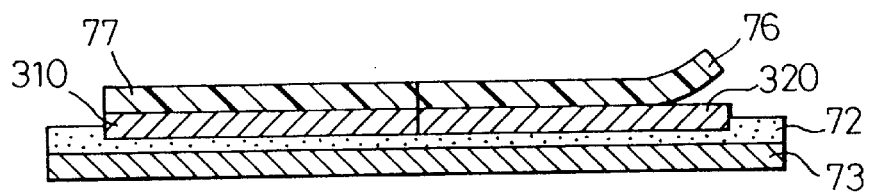

At a next stage of the integration of the divided upper and lower holograms 310 and 320, a hot laminator H as shown in FIG. 9, which comprises a pair of hot press rollers 90 and 91, is used. Namely, the holograms 310 and 320 together with the base plate 73 having the adhesive layer 72 facing the holograms 310 and 320 are pressed between the hot rollers 90 and 91 which are rotated. Thus, the holograms 310 and 320 are firmly applied to the base plate 73 via the adhesive layer 72. Then, as shown in FIG. 10, the transparent films 76 and 77 are peeled off.

Figure 11:
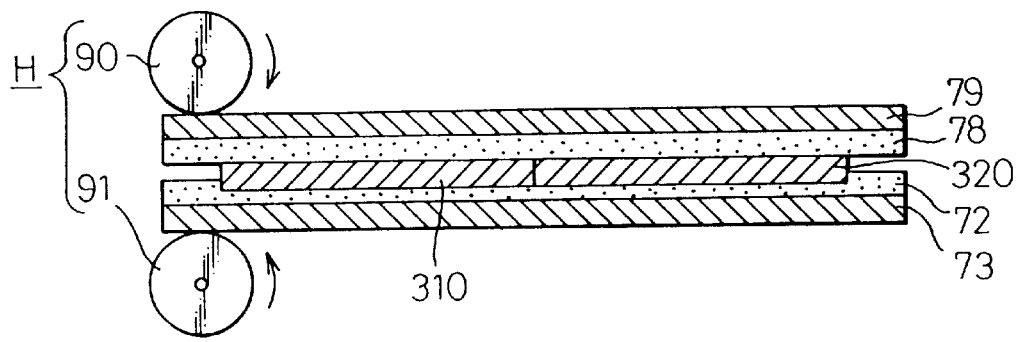
Figure 12:
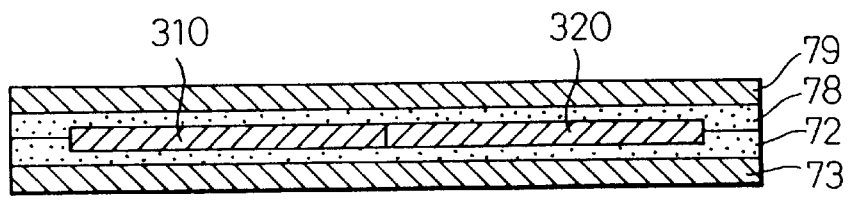

As shown in FIG. 11, the holograms 310 and 320 thus laminated with the base plate 73 via the adhesive layer 72 are covered by a cover film 79 with an adhesive layer 78 facing the holograms 310 and 320 and are passed between the hot press rollers 90 and 91 of the hot laminator H in the similar way. As a result, an integrated, laminated hologram assembly is obtained as shown in FIG. 12.

Figure 13:
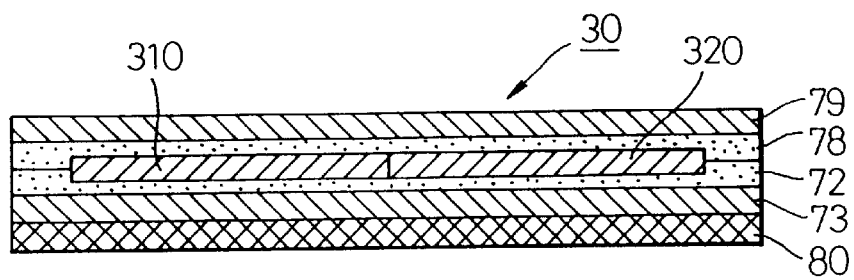

In the final stage, as shown in FIG. 13, on an upper or lower side of the film shape of the hologram assembly, a layer 80 of an adhesive material is laminated by any suitable means such as a laminator or aqueous adhesive. Due to this structure of the integrated hologram, an application of a desired size of a hologram device 30 to a desired location become possible.

Second Embodiment

According to the present invention, it is necessary that, in order to obtain an integrated assembly 30, the holograms 310 and 320 are arranged carefully so that a gap is not created in the seam between the holograms 310 and 320. Now, a method according to present invention for arranging holograms without generating any gap between the holograms 310 and 320, which are adjacent with each other, will be explained, with reference to FIGS. 14*a* and 14*b* to FIGS. 16*a* and 16*b*.

Figure 14A:
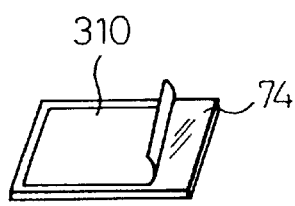
Figure 14B:
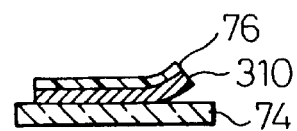
Figure 15A:
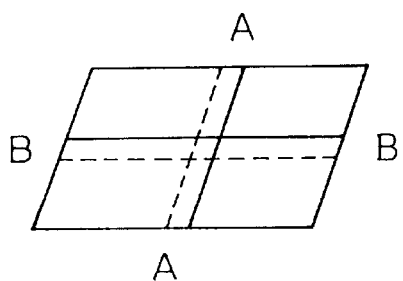
Figure 15B:
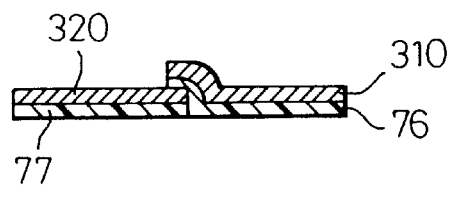
Figure 16A:
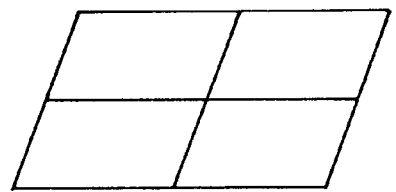
Figure 16B:
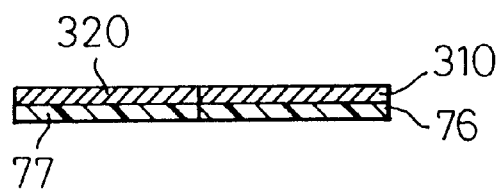

In the first step of the process, the hologram 310 as produced by the method as explained with reference to FIGS. 1 to 13 is stripped from the glass plate 74 as shown in FIGS. 14*a* and 14*b*. Similarly, the hologram 320 is also stripped from the glass plate 75. Then, the hologram sections 310 and 320 are arranged so that side edges of the hologram sections, which are adjacent with each other, are slightly overlapped as shown, in particular, in FIG. 15*b*. Then, a cut is made along seam lines A—A and B—B located along the overlapped portion as shown in FIG. 15*a* by using a cutting tool, so that overlapped portions are removed as shown in FIGS. 16*a* and 16*b*. Then, an application of the adhesive layer 73 via the adhesive layer 72 is done, which is followed by the similar process for obtaining a hologram assembly 30, which is similar to that as already explained with reference to FIGS. 9 to 13.

In short, according to this embodiment, in order to obtain a plurality of holograms 310 and 320, which are, in a two dimensional space, connected with each other by means of a basic plate 73 as a connecting means, the holograms are, at their edges portions, overlapped and the overlapped portions are, then, subjected to cutting. Thus, in comparison with the method where the hologram sections are merely connected so that an end to end connected condition is obtained and is then connected with each other, a neater end to end connected construction, i.e., a seamless structure of the hologram assembly 30, can be obtained.

Third Embodiment

According to the embodiment, an optimum arrangement of the hologram device 30 obtained by the method according to present invention is determined by tests. Namely, evaluations of the reliability, the invisibility of an end of the hologram device 30, and the workability were done.

In this embodiment, the base plate 73 is made from a polyethylene terephtharate, and the adhesive layer 72 is made from ionopolymer.

The hot laminate was done by a hot laminator having hot rolls 90 and 91 in FIG. 9 having a diameter of 150 mm and an air cylinder for pressing having a diameter of 63 mm. The temperature of the roll is in a range between 100 to 130° C. and the pressure at the pressure cylinder is in a range between 1 to 4.5 kg/cm².

The reliability was evaluated by a degree of change in a wave length, a degree of change in an efficiency and a degree of change in a half band width.

The non-visibility of the end of the hologram element was evaluated by a sensory test as to a screen of an increased size made of a multiplicity of hologram elements as integrated. Namely, a determination of a good result is obtained when a boundary between ends of hologram elements which are adjacent with each other is not noticeable by an observer.

The workability was evaluated by actually executing an application of hologram element to a window glass.

The result of the test is shown in the following table I.

Result of Evaluation of Reliability

| Thickness of Rosin Film (μm) | Thickness of Hotmelt (μm) | Ratio of Change in Wave Length (%) | | Ratio of Change in Efficiency (%) | | Ratio of Change in Half Band Width (%) | | Non-Visibility of Ends of Hologram | Workability |
|---|---|---|---|---|---|---|---|---|---|
| 12 | 30 | −0.9 | ○ | −2.3 | ○ | −1.8 | ○ | ○ | ○ |
|  | 50 | +0.7 | ○ | −1.9 | ○ | −2.2 | ○ | ○ | ○ |
| 25 | 30 | −1.2 | ○ | +1.6 | ○ | −3.0 | ○ | ○ | ○ |
|  | 50 | +1.1 | ○ | −1.5 | ○ | −1.2 | ○ | ○ | ○ |
| 50 | 30 | −2.5 | ○ | −2.2 | ○ | −1.5 | ○ | ○ | ○ |
|  | 50 | +0.2 | ○ | −2.2 | ○ | +2.1 | ○ | ○ | ○ |
| 100 | 30 | +1.8 | ○ | +1.9 | ○ | +0.5 | ○ | ○ | Δ |
|  | 50 | −2.9 | ○ | −1.5 | ○ | −3.0 | ○ | ○ | Δ |
|  | 75 | −1.4 | ○ | −1.2 | ○ | −2.3 | ○ | ○ | Δ |
| 188 | 50 | +2.2 | ○ | +1.8 | ○ | −2.3 | ○ | ○ | Δ |
|  | 75 | +0.8 | ○ | −1.2 | ○ | −2.1 | ○ | ○ | Δ |
| 250 | 50 | −2.6 | ○ | −1.9 | ○ | −2.3 | ○ | ○ | x |
|  | 75 | −1.9 | ○ | −1.3 | ○ | −0.9 | ○ | ○ | x |

○: Good
Δ: Medium
x: Bad

As will be clear from the above table, good results were obtained as to the reliability as well as the non-visibility when the thickness of the base plate 73 is in a range between 12 to 250 μm and the thickness of the hot melt layer is in a range between 30 to 37 μm. However, from the view point of the workability, the total thickness of the hologram assembly 30 is, desirably, about 500 μm or less and, more desirably is about 200 μm or less. Namely, the film of an increased thickness causes the film, itself, to have a significant strength, which makes it less effective for the execution of an application of the hologram to the glass plate.

Fourth Embodiment

The present invention is also related to a method for the exposure of divided hologram sections of a desired number such as 2×2 along the length and width, as shown in FIG. 16a which are combined so as to construct a single hologram assembly. An optical system is shown in FIG. 17, which is a rotated view of the exposure system of a section 20a of a photo-sensitive member shown in FIG. 18. On the other hand, FIG. 19 shows a one shot exposure system of a photo-sensitive member 20 prior to a division to sections 20a of the number of 2×2 along the length and width. FIG. 18 is a view of an exposure of the section 20a after division as well as the diffusing body 24a viewed from a direction opposite to the direction of the reference light 22 to the photo-sensitive member toward the direction of z-axis shown in FIG. 19 which corresponds to a direction of incident axis 26a of the object light 26. Thus, FIG. 17 is view which is obtained by rotating the optical system in FIG. 18 about the axis transverse to the paper and passing central point $C_1$ of the sectioned photo-sensitive member 20a, while the axis 22c of the reference light 22, which connects the diverging point 22b of the reference light 22 with the central point $C_1$ of the sectioned photo-sensitive member 20a, is coincident with a horizontal plane x1 for an exposure in the x-z plane, which includes the axis object light (not shown). It should be noted that an arrangement of the optical system of this embodiment viewed from the above is unchanged with respect to that in FIG. 4.

In this embodiment, in FIG. 18, the photo-sensitive member 20a and the light diffusing body 24a are rotated for a predetermined angle $\theta_b$ about an axis which passes the central point C1 of the photo-sensitive member 20a and is transverse to the plane of the paper of FIG. 18, while the relative positional relationship between the members 20a and 24a is maintained, so that the diverging point 22b of the reference light 22 comes to the horizontal plane x1, for the exposure, on which the axis 22c of the reference light 22 and the axis of the object light are both located. Thus, an advantage is obtained that the optical systems for the divided four hologram sections are located on the same horizontal plane for the exposure.

Now, an advantage of this embodiment will be further explained. FIG. 19 shows, in a three dimensional coordinate system, a desired arrangement between the photo-sensitive member prior to the division and the light diffusing body 24 of a necessary size. FIG. 19 also shows four sections 20a divided from the photo-sensitive member 20 and a diffusing body 24a of a necessary size for divided one section 20a. In FIG. 19, the origin of the coordinate corresponds to the center point C of the photo-sensitive member 20 prior to the division. Furthermore, in the coordinate system, the x-axis corresponds to a lateral direction of the member 20, while y-axis corresponds to a longitudinal direction of the member 20. Finally, the z-axis is transverse to the photo-sensitive member and the object light 26a is, toward the central point C, introduced vertically to the photo-sensitive member.

Prior to the division, the central point C of the photo-sensitive member 20 as well as the diverging point 22b of the reference light 22 are located on the same horizontal plane x including the axis of the object light (not shown). This plane including the axis 22a of the reference light 22 and the axis 26a of the object light 26 is referred as an "exposure horizontal plane". However, after the division of the photo-sensitive member to the four (2×2) sections is done, the height of the central point $C_1$ of the divided section 20a of the photo-sensitive member 20 is changed from the diverging point 26b. In other words, the axis 22c of the reference light 22 is inclined with respect to the "exposure horizontal plane". FIG. 20 shows an optical system for an exposure of the sectioned photo-sensitive member 20a, wherein the axis 22c of the reference light 22 is not located in the x-z plane which corresponds to the "exposure horizontal plane" but is inclined with respect to the plane.

In FIG. 20, an axis 26c is one which is parallel to the axis 26a of the object light in FIG. 19 and is directed to the central point $C_1$. Furthermore, FIG. 18 is the view of the optical system viewed along the direction as shown by an arrow D in FIG. 20. In FIG. 18, the axis 22c of the reference light 22 is inclined to the exposure horizontal surface x at an angle of θb. Thus the plane, constructed by the axis 22c of the reference light 22 and the axis the object light which is passed through the central point $C_1$ of the photo-sensitive member 20a and which is transverse to the plane of the paper, is also inclined with respect to the exposure horizontal plane x as an angle of θb. Such an inclination makes it difficult to properly arrange the optical system. However, according to present invention, a rotating movement for an angle $θ_b$ about the center point $C_1$ of the photo-sensitive member 20a from the condition in FIG. 18 to the condition in FIG. 17 is done while keeping a relative position between the photo-sensitive member 20a and the light diffusing 24a, which makes it possible that the above problem is overcome. Thus, in the execution of the present invention, the axis 22c of the reference light 22 as well as the axis 26c of the object light 26, i.e., the central point C1 of the photo-sensitive member 20a are located in the same horizontal plane x1. An incident angle of the reference light 22 is an incident angle to the central point $C_1$ of the photo-sensitive member 20a in the plane 85 which includes the axis 22c of the reference light 22 and is transverse to the plane of the paper. Furthermore, the incident distance is a distance between the diverging point 22b of the reference light as actually generated and the central point $C_1$ of the photo-sensitive member 20a.

In short, the rotating movement of an angle $θ_b$ about the axis 26a of the object light, which passes through the central point $C_1$ of the photo-sensitive member 20a and is transverse to the plane of the drawing, causes the optical system as shown in FIG. 17 to be obtained, which allows the exposure process to be easily executed.

Above explanation is related to a case where the photo-sensitive member 20 is divided to four sections 20a, i.e., 2×2 in a longitudinal and lateral directions, respectively. However, it is also possible to employ a number of divisions more than two in the lateral and or longitudinal direction.

Furthermore, as similar to the embodiment as explained with reference to FIG. 4, the light for illuminating the light diffusing body may be a diverging beam rather than parallel beam. When the diverging beam is used, it is necessary that the light diverging performance of the light diffusing body is one which can obtain an increased diverging range and that the incident angle to the end of the light diffusing body at its end must be smaller than the angle corresponding to the increase in the diverging capacity of the light diffusing body.

Furthermore, in the optical system for exposure in this embodiment, it is desirable that the size of the light diffusing body is determined in the similar manner as that done in the first embodiment, thereby allowing re-generation of a colored image in the desired view range while obtaining an unified color at the seam line of the hologram sections.

Fifth Embodiment

Figure 21:
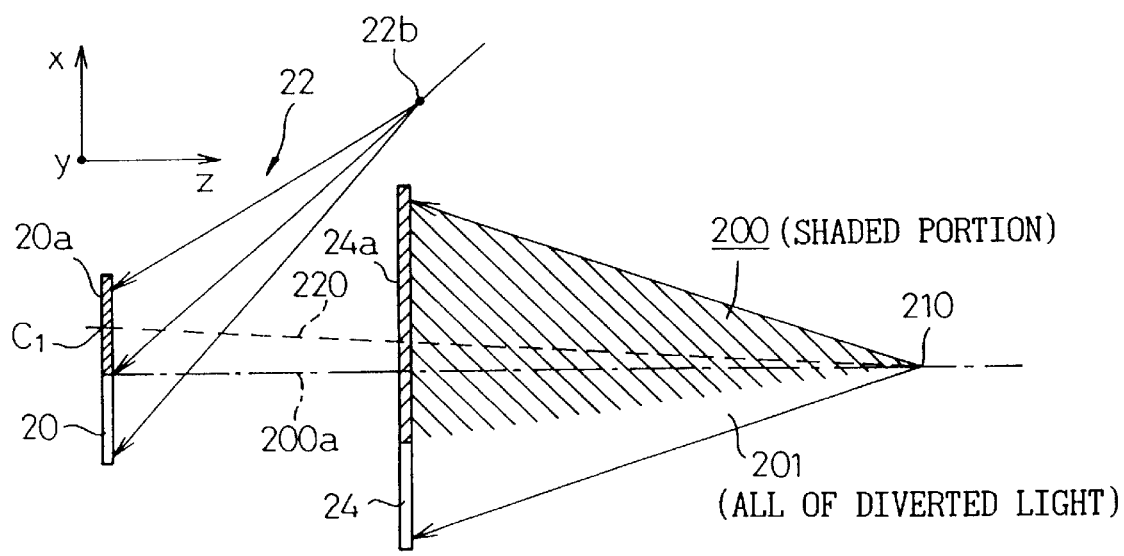
Figure 22:
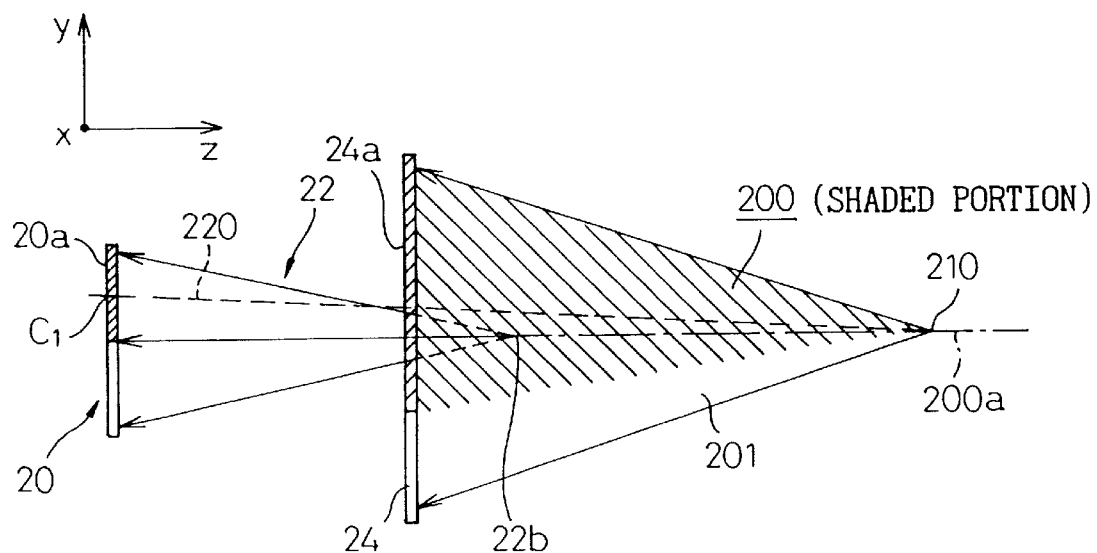

The following embodiment, which will now be explained, is directed to the use of a diverging light as a laser light for an illumination of the light diffusing body. Namely, in this embodiment, shown in FIGS. 21 and 22, a diverging point is designated at a point 210 in an optical system for producing a hologram of a desired size by a single exposure. FIG. 21 is a side view of the optical system in FIG. 19 viewed in a direction of B while FIG. 22 is a side view of the optical system viewed in a direction of C. As will be seen from FIGS. 21 and 22, the axis 200a of the diverging light 201 passing through the diverging point 210 is directed transversely to the light diffusing body 24 and the photo-sensitive member 20.

In order to cause the photo-sensitive member 20 to be divided, it is necessary that a diverging light 200 from the diverging point 210 as shown by a shaded portion is directed to the central point $C_1$ of the divided photo-sensitive member 20a and has an axis 220 introduced obliquely into the light diffusing body 24. In particular, if a division into four (2×2) or more sections is done, the axis 220 of the diverging light 200 is also inclined to the "exposure horizontal plane" which includes the axis 200a of the diverging light 201 and is transverse to the plane of the paper in FIG. 22, which corresponds, in FIG. 21, to the plane of the paper itself which includes the axis 200a of the diverging light 201. Furthermore, as shown in FIG. 21, the reference light 22 from the diverging point 22b is directed to the central point C1 of the photo-sensitive member 20a itself, while also being in an inclined condition.

In view of this, a similar problem as explained with reference to the fourth embodiment arises. Namely, since the diverging light 200 for illuminating the light diffusing body 24a and the reference light 22 from the diverging point 210 and 22b, respectively, located outside the "exposure horizontal plane" are introduced obliquely, the optical system for the exposure cannot be located in the exposure horizontal plane, which makes an arrangement of the system difficult.

This embodiment is directed to solving this problem, i.e., a photo-sensitive member is subjected to a division, and an independent exposure is done for the divided sections, which is followed by an integration of the section so as to provide a hologram screen of an increased size. Now, a method for realizing this idea will be explained in detail with reference to FIGS. 23 and 25, which show an optical system for an exposure for a photo-sensitive member divided into a four (2×2) sections.

Figure 25:
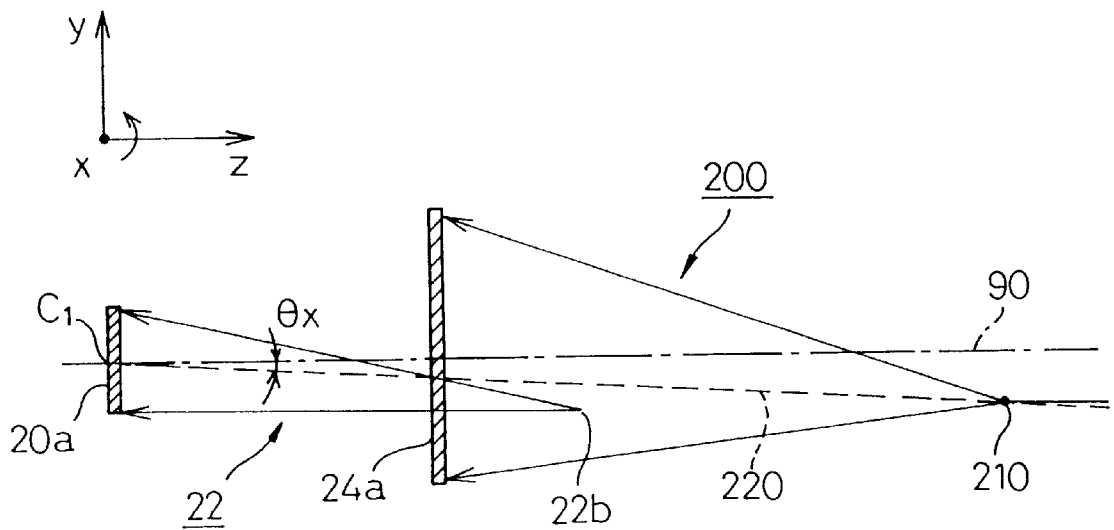

In FIGS. 22 and 25, the "exposure horizontal plane" is the plane which includes the axis 90 transverse to the central point $C_1$ of the division to the photo-sensitive member 20a and transverse to the plane of the paper. A rotation of the optical system for the exposure in the coordinate system (x, y, z) transverse to the central point $C_1$ is done in such a manner that the axis 220 of the diverging light 220 is coincided with the axis 90 on the "exposure horizontal plane" transverse to the central point C1 of the photo-sensitive member 20a while the diverging point 22b comes to be situated on the "exposure horizontal plane".

Figure 23:
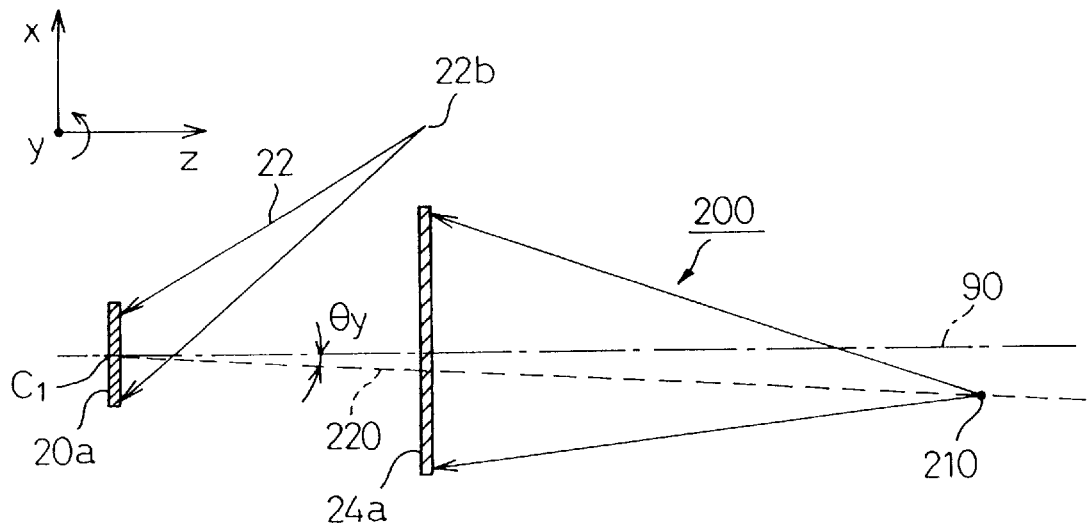
Figure 24:
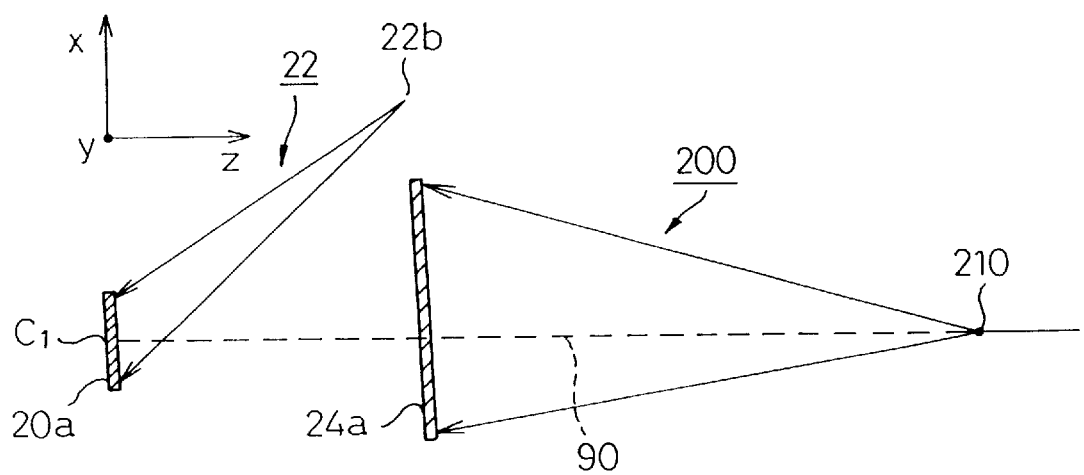

In more detail, in FIG. 23, as a first stage, a rotating movement of the entire optical system is done, about the y-axis, through an angle of $θ_y$ in such a manner that the axis 220 of the diverging light for illuminating the light diffusing body 24a coincides with the axis 90. FIG. 24 shows a condition where this rotating movement of the optical system is completed.

Figure 26:
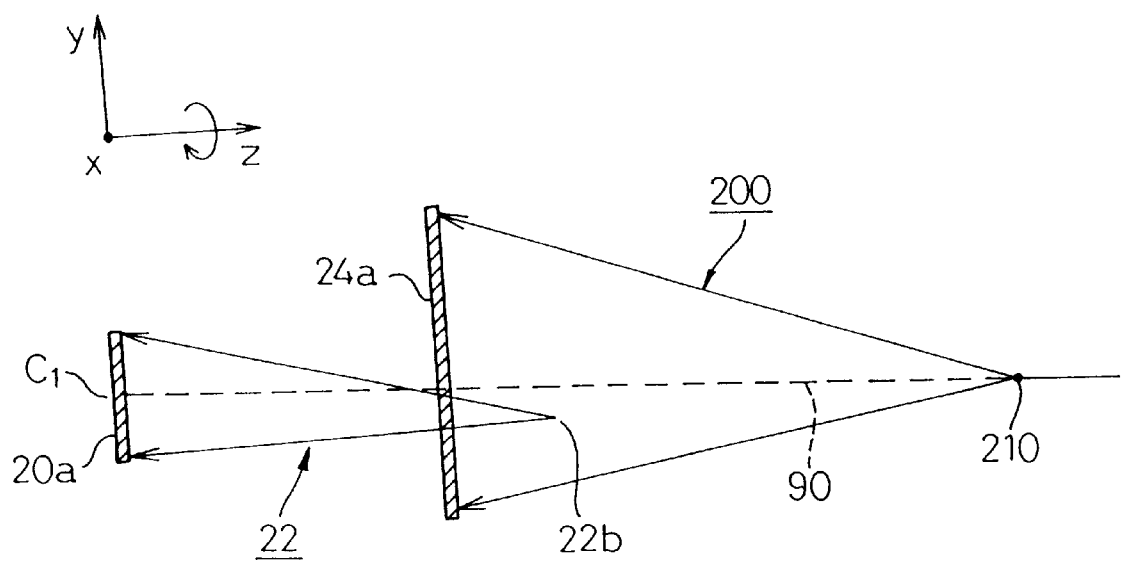

At the next stage, in FIG. 25, a rotating movement about the x-axis of the entire optical system for an angle of θx is done in such a manner that the axis 220 coincides with the axis 90, thereby obtaining a condition as shown in FIG. 26.

At a final stage, a rotation about the z-axis is done in such a manner that the axis 22b of the reference light 22 is come to be situated on the "exposure horizontal plane". This rotating movement is the same as that in the second embodiment, i.e., the rotating movement from the position in FIG. 18 to FIG. 17 when viewed from the rearward direction along z-axis.

Figure 27:
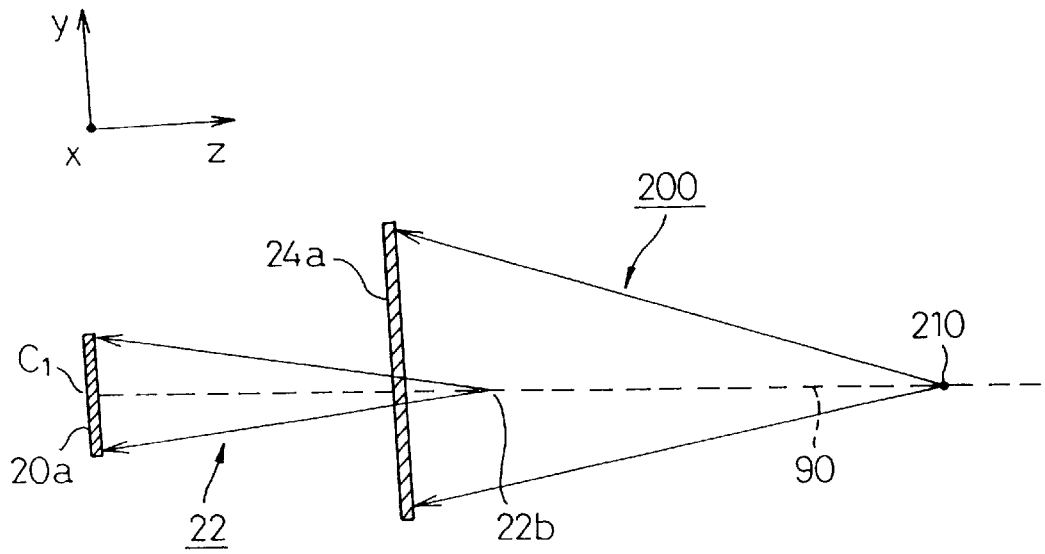

As a result of the independent rotating movements in the three axial directions, the optical system is finally located in the coordinate system (x, y, z) as shown in FIG. 27. Due to the employment of this embodiment, rotating movements in the three axis x, y and z are independently done, which makes it possible that a setting of the optical system for an exposure is easily done.

Finally, in this embodiment, an illustration is given as to a case where the laser beam for illuminating the light diffusing body is a diverging light. However, in an obliquely arranged parallel beam, a design of the optical system for an exposure is possible by employing the idea of this embodiment.

Sixth Embodiment

In the exposure system in the above embodiment, the rotated, sectioned photo-sensitive members and the diffusing body after the completion of the exposure are inclined as shown by reference numerals 350, 360, 370 and 380, respectively. In this preferred embodiment, which will now be explained, a single photo-sensitive member 20a or a single diffusing body 24a has a size of a photo-sensitive member or a diffusing body, which allows the inclined photo-sensitive members 20a or diffusing body 24a at any of position of 350, 360, 370 and 380 to be exposed, as will fully explained hereinbelow.

Specifically, FIG. 28 shows a single light diffusing body 24a, which allows all of the photo-sensitive members to be exposed. Namely, in this embodiment, during the execution of an exposure process, the photo-sensitive members 20a are held at the inclined positions 350, 360, 370 and 380, respectively, and, at each inclined position of the photo-sensitive member 20a, an exposure process is executed together with a mask 390a for the photo-sensitive member and a mask 390b of the diffusing body for the respective inclination. This embodiment is desirable in that steps for rotating the photo-sensitive member 20a as well as the light diffusing body 24b are eliminated.

In the above embodiment, it is desirable that the mask 390a and 390b are made of frosted black opaque plates, having respectively inclined openings as shown in FIG. 29 at positions 350, 360, 370 and 380, respectively.

In this last embodiment, the mask 390a for the photo-sensitive member 20a can be eliminated, if photo-sensitive members are, depending on the material therefor, adhered or painted only at necessary locations.

Furthermore, in this embodiment, in the hologram exposure, systems, between the inclined photo-sensitive members 350 and 380 and between 360 and 370, the reference light 22 in FIG. 29 can be commonly used. Namely, in the hologram exposure systems between the inclined photo-sensitive members 350 and 380 and between 360 and 370, the optical systems other than masks 390a to be exchanged can be commonly used. In other words, the exposure of the right-handed and the left-handed photo-sensitive member can be done by merely changing masks 390a. Thus, this embodiment has advantages in that steps for the setting of the optical system are highly simplified. Finally, this embodiment can also be realized in any number of divided sections including the embodiment as explained with reference to in FIGS. 17 to 19.

Seventh Embodiment

Now, an embodiment directed not to a hologram screen but to a hologram of an increased size which is used for a projection of an imaginary image and is subjected to a divided exposure will be described. In this embodiment, as shown in FIG. 31, a display of a type where an image from an image generating element such as a crystalline liquid is used and a light source is arranged at its rear side. The image is projected onto a hologram 404 to provide a virtual image to be observed by an observer 5. In order to obtain the hologram 404 used in such a system, as shown in FIG. 32, a photo-sensitive member 410 is subjected to exposure, by two diverging lights 406 and 408, on its opposite sides.

In case where the photo-sensitive member is divided to 4 (2×2), a rotating movement is done in such a manner that the axis from the diverging points 406 and 408 and directed to the central points $C_1$, $C_2$, $C_3$ and $C_4$ by are located on the "exposure horizontal plane" containing the central point photo-sensitive member C prior to the division and the diverging points 406 and 408. As a result, exposures for four holograms are realized by respective exposure optical systems located on one and the same exposure horizontal plane.

Eighth Embodiment

A further embodiment is directed to the minuatualization of a light diffusing body by, in the system in the first embodiment, arranging a mirror which is transverse to the light diffusing body. By employing this arrangement, a reduction in the size of the light diffusing body to a size the same as that of the hologram photo-sensitive member is realized without changing a spectral characteristic of the hologram, i.e., a color tone of an image during the regeneration process and without changing a view angle (range). Now, the details of this embodiment will be explained with reference to FIGS. 34 and 35.

In FIG. 34, mirrors 81, 82, 83 and 84 are transversely and fixedly connected to the light diffusing body 24. These mirrors 81, 82, 83 and 84 have mirror surfaces which are faced inwardly. Furthermore, among the mirrors, the mirror 82 on the inlet side of the reference light 22 is short which prevents the reference light 22 from being blocked by the mirror 82, which allows the photo-sensitive member 20 to be, over its entire surface, illuminated. The remaining mirrors 81, 83 and 84 have the same length as shown in FIG. 35.

The hologram produced by this embodiment has the same spectral characteristic as that of the hologram produced by the first embodiment, thereby obtaining a regeneration image with color. The reason will be explained hereinbelow in detail. Namely, in FIG. 36, of the object light 26 passing through the light diffusing body 24, a part of the object light 85 is introduced into the photo-sensitive member 20, which contributes to produce a hologram. However, the remaining part of the object light 86 is not introduced into the photo-sensitive member and does not contribute to the formation of the hologram. However, due to the use of the mirror 80 as shown in FIG. 37, the object light 86, which is otherwise not used, is subjected to reflection at the mirror and is introduced into the photo-sensitive member 20. Thus, the mirror 80 can functions in similar way as the light diffusing body 24a as shown by the phantom line. Thus, a setting of the size of the mirror 80 is possible so as to make it to function as the light diffusing body of the desired sized, thereby obtaining the same spectral characteristic as that of the hologram produced purely by the light diffusing body as is the case in the first embodiment.

In this embodiment, the size of the mirror can be determined by the following equations, $$M = L1/\tan \theta$$

$$\theta = \tan_{-1}((L1+L2)/L),$$

where, in FIG. 38, $\theta$ is an angle formed by a line connecting the end 24b of the diffusing body 24 of a size determined in accordance with the necessary view area with the end 20a of the photo-sensitive member 20 and a perpendicular to the diffusing body 24 from the end 20a of the photo-sensitive member 20, L is the distance between the photo-sensitive member 20 and the diffusing body 24, L1 is a length of the light diffusing body, L2 is a lateral distance between an end 20a of the photosensitive member 20 and the mirror, and M is a length of the mirror 80.

By using mirror of the above defined length, a production of a hologram is possible, where the necessary view range is satisfied and while keeping the same spectral characteristic as that of the case where only a light diffusing body is used. Furthermore, a reduction of the size of the light diffusing body is realized, which allows the strength of the object light to be increased, thereby reducing the exposure time for producing a hologram.

Ninth Embodiment

As to the structure of hologram device 30, the one as explained with reference to FIG. 13 can be used but it is not limited thereto. Namely, a construction as shown in FIGS. 39 to 48 can be employed. The adhesive layer 72 and the base plate can be any desired size so long as they function as a connecting means for integrating the holograms 310 and 320 for obtaining an spatially expanded sized.

Furthermore, the hologram assembly 30 according to present invention can be used in any number of division in a longitudinal and lateral directions as illustrated by an integrated construction in FIGS. 49a and 49b.

Furthermore, in the hologram assembly 30 according to present invention, a colored film of a color which does not cause the quality of an image in the holograms 310 and 320 to be deteriorated can be used, thereby obtaining an increased decorative effect.

Furthermore, as shown in FIG. 50, a laminated structure of holograms produced by the same optical system can be used by using an intermediate layer 500 of a desired number and made of an adhesive or hot melt material, so long as a desired transparency of the hologram is maintained. As a result of this, an improvement is obtained as to a color regeneration characteristic as well as to a displaying characteristic.

FIG. 51a shows a device for evaluating a single laminate (double layer) structure of the hologram in FIG. 50. FIG. 51b is relationship between the regenerating wave length and an efficiency in comparison with the result of a single layer hologram. FIG. 51c shows a chromaticity diagram when a white light is regenerated by using as a light source a projector XV-E500 produced by Sharp Co.

As shown in FIG. 51a, an illumination light is introduced into the hologram at an angle 31° with respect to the plane of the hologram. As to a diffraction light in a vertical plane of the hologram, an evaluation of the spectral characteristic is done by measuring the wave-length and the regeneration efficiency, as shown in FIGS. 51b and 51c. In FIG. 51b, curves H1 and H2 are the regeneration efficiency for single holograms, while curve H is the regeneration characteristic for the laminated hologram structure in FIG. 50. As will be seen, an increased value of efficiency is obtained in the embodiment of the present invention.

Furthermore, in FIG. 51c, H1 and H2 show, respectively, cordinate positions of regeneration light in the chromaticity diagram when a single layer hologram is used. H shows a cordinate position of regeneration light in the chromaticity diagram when a combined or laminated hologram is used. It will be clear that a color tone characteristic nearer to a white color position P is obtained by the combined (laminated) structure in this embodiment.

What is claimed is:

1. A method for producing a hologram comprising:
generating a reference light;
generating an object light passed through a light diffusing body;
and exposing a photo-sensitive member by the reference light and the object and the object light so that interference occurs so that a diffraction grating corresponding to the light diffusing body is recorded on the photo-sensitive member;

the size of the light diffusing body being such that the hologram has a spectral characteristic of a diffused light from the hologram such that, in at least the wavelength range of visible light, a desired efficiency is obtained;

wherein the desired size of the light diffusing body which allows the hologram to have a spectral characteristic of a diffused light is of such a size that a difference m between the length S of a side of the light diffusing body and the length M of a side of the photo-sensitive member satisfies the following equation:

$m = S - M = S_1 + S_2;$ $S_1 \geq L \times \tan(\sin^{-1}((\sin\theta_1 - \sin\theta c) \times (\lambda_0/\lambda_{c2}) + \sin\theta r) - M_1,$ and $S_2 \geq L \times \tan(\sin^{-1}((\sin\theta_1 - \sin\theta c) \times (\lambda_0/\lambda_{c1}) + \sin\theta r) - M_2,$ Where:

$\theta r$ is an incident angle of the reference light to the photo-sensitive member;

$\theta_0$ is an incident angle of the object light from the light diffusing body introduced into the photo-sensitive member;

$\theta c$ is an incident angle of the regenerating light introduced into the hologram as produced;

$\theta_I$ is an exit angle of the diffraction light from the hologram $\lambda_0$ is a wavelength of the laser beam during the recording;

$\lambda c$ is a wavelength in the diffracted direction $\theta_I$, where $\lambda c$ is in a range $\lambda_{c1}$ to $\lambda_{c2}$ and $\lambda_{c1}$ is 380 nm and $\lambda_{c2}$ is 780 nm;

L is a distance between the light diffusing body and photo-sensitive member during a recording to the photo-sensitive member;

$S_1$ is a difference in length between the light diffusing body and the photo-sensitive member on the side adjacent the inlet side of the reference beam;

$S_2$ is a difference in length between the light diffusing body and the photo-sensitive member on the side opposite the inlet side of the reference beam;

$M_1$ is a distance between an end of the photo-sensitive member adjacent the inlet side of the reference light and a point A on one of the photo-sensitive member and the hologram where the reference light is introduced, and;

$M_2$ is a distance between an end of the photo-sensitive member opposite to the inlet side of the reference light and the point A.

2. A method according to claim 1, wherein a plurality of holograms on which the light diffusing body is recorded are integrally arranged in a two dimensional area.

3. A method according to claim 1, further comprising;

partially overlapping the holograms which are adjacent to each other; and cutting the overlapped portions, so that the holograms are integrated.

4. A method for producing a hologram comprising:
generating a reference light;
generating an object light passed through a light diffusing body; and
exposing a photo-sensitive member by the reference light and the object light so that interference occurs so that a diffraction grating corresponding to the light diffusing body is recorded on the photo-sensitive member;

wherein the exposure of the photo-sensitive member is done by rotating, in a system for exposing the photo-sensitive member, the photo-sensitive member and the light diffusing body about an axis transverse to and passed through the center of the photo-sensitive member by the same angle in such a manner that the optical system for an exposure of the photo-sensitive member is kept horizontal.

5. A method according to claim 4, wherein the rotating movement of the photo-sensitive member and the light diffusing body is done independently about the each of three axes which are orthogonal to each other and which are transverse to and passed through the center of the photo-sensitive member.

6. A method according to claim 5, wherein a plurality of holograms on which the light diffusing body is recorded are integrally arranged in a two dimensional area.

7. A method according to claim 5, further comprising:

partially overlapping the holograms which are adjacent to each other; and cutting the overlapped portions, so that the holograms are integrated.

8. A method according to claim 4, wherein an exposure of the photo-sensitive member is done in such a manner that an unnecessary part of at least the light diffusing body is made to be opaque.

9. A method according to claim 4, wherein a plurality of holograms on which the light diffusing body is recorded are integrally arranged in a two dimensional area.

10. A method according to claim 4, further comprising:

partially overlapping the holograms which are adjacent to each other; and cutting the overlapped portions, so that the holograms are integrated.

* * * * *